(12) United States Patent
Kim et al.

(10) Patent No.: US 7,345,727 B2
(45) Date of Patent: Mar. 18, 2008

(54) SUBSTRATE FOR A LIQUID CRYSTAL DISPLAY DEVICE AND FABRICATING METHOD THEREOF

(75) Inventors: Woong-Kwon Kim, Gyeonggi-do (KR); Se-June Kim, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 549 days.

(21) Appl. No.: 11/023,621

(22) Filed: Dec. 29, 2004

(65) Prior Publication Data

US 2005/0140842 A1    Jun. 30, 2005

(30) Foreign Application Priority Data

Dec. 30, 2003  (KR) ............... 10-2003-0099918

(51) Int. Cl.
*G02F 1/1333*  (2006.01)
*G02F 1/13*    (2006.01)

(52) U.S. Cl. ................. 349/138; 349/106; 349/187

(58) Field of Classification Search ........ 349/106–109, 349/138, 187
See application file for complete search history.

(56) References Cited

U.S. PATENT DOCUMENTS 5,943,107 A * 8/1999 Kadota et al. ............. 349/44
7,130,001 B2 * 10/2006 Chang et al. .............. 349/43
7,158,206 B2 *  1/2007 Kim et al. ................ 349/187

* cited by examiner

*Primary Examiner*—Andrew Schechter
*Assistant Examiner*—John Heyman
(74) *Attorney, Agent, or Firm*—McKenna Long & Aldridge LLP

(57) ABSTRACT

A substrate for a liquid crystal display (LCD) device includes: gate and data lines crossing each other to define a pixel region on a substrate; a thin film transistor adjacent to where the gate and data lines cross, the thin film transistor including a gate electrode, a semiconductor pattern, a source electrode and a drain electrode; a black matrix corresponding to the gate and data lines and the thin film transistor; a first insulating layer disposed on the black matrix and including first and second portions, the first portion corresponding to the pixel region and having a first thickness, and the second portion having a second thickness smaller than the first thickness; a color filter pattern disposed on the first insulating layer and corresponding to the first portion; a first insulating layer disposed on the color filter pattern including first and second portions, the first portion corresponding to the color filter pattern and has a first thickness, and the second portion having a second thickness smaller than the first thickness; and a pixel electrode disposed over the color filter pattern and being connected with the thin film transistor.

14 Claims, 26 Drawing Sheets

SUBSTRATE FOR A LIQUID CRYSTAL DISPLAY DEVICE AND FABRICATING METHOD THEREOF

The present invention claims the benefit of Korean Patent Application No. 2003-99918 filed in Korea on Dec. 30, 2003, which is hereby incorporated by reference for all purposes as if fully set forth herein.

BACKGROUND OF THE INVENTION

1. Field of the Invention

The present invention relates to a liquid crystal display (LCD) device, and more particularly, to a substrate for an LCD device and a fabricating method thereof.

2. Discussion of the Related Art

Until recently, display devices typically employed cathode-ray tubes (CRTs). Now, flat panel displays are being used instead of CRTs. Many efforts are being made to study and develop various types of flat panel displays, such as liquid crystal display (LCD) devices, plasma display panels (PDPs), field emission displays, and electro-luminescence displays (ELDs) as substitutes for CRTs. Of these flat panel displays, the LCD devices have advantages, such as high resolution, light weight, thin profile, compact size, and low voltage power supply requirements.

In general, an LCD device includes two substrates that face each other and spaced apart with a liquid crystal material interposed between the two substrates. Each of the two substrates include electrodes that face each other. A voltage supplied to the electrodes induces an electric field across the liquid crystal material. Alignment of the liquid crystal molecules in the liquid crystal material changes in accordance with the intensity of the induced electric field into direction of the induced electric field, thereby changing the light transmissivity of the LCD device. Thus, the LCD device displays images by varying the intensity of the induced electric field.

FIG. 1 is a perspective view of an LCD device according to the related art. As shown in FIG. 1, an LCD device 11 includes an upper substrate 5, a lower substrate 22, and a liquid crystal material 14 between the substrates. The upper substrate 5 is referred to as a color filter substrate that includes a color filter pattern 8, a black matrix 6 between the color filter patterns 8, a common electrode 18 on both the color filter pattern 8 and the black matrix 6. The lower substrate 22 is referred to as an array substrate that includes a pixel electrode 17, a thin film transistor T, a gate line 13, a data line 15, and a storage capacitor C. The data line 15 and the gate line 13 cross each other to define the pixel region P. Each pixel region P includes a pixel electrode 17 and a thin film transistor T, which is used as a switching device. The thin film transistor T is disposed adjacent to where the gate line 13 and the data line 15 cross. The storage capacitor C is connected to the pixel electrode 17 and has a storage electrode 30 as a first electrode and uses the gate line 13 overlapping the storage electrode 30 as a second electrode. There is a possibility of light leaks in the LCD device due to a misalignment in the attachment of the upper and lower substrates 5 and 22.

FIG. 2 is a cross-sectional view taken along line II-II of FIG. 1. As shown in FIG. 2, a thin film transistor T includes a gate electrode 32, a semiconductor pattern 34, a source electrode 36 and a drain electrode 38 disposed on the first substrate 22. A passivation layer 40 is disposed on the thin film transistor T. A black matrix 6 corresponding to a gate line 13, a data line 15 and a thin film transistor T is disposed on the second substrate 5. Red, green and blue color filter patterns 8a, 8b and 8c corresponding to respective pixel regions P are also disposed on the second substrate 5.

To prevent cross-talk, the data line 15 and the gate line 13 are space apart from the pixel electrode 17 by a first distance A and a second distance B, respectively. Since light leakage can happens through the first and second distances A and B, the black matrix 6 covers the first and second distances A and B. Further, the black matrix 6 blocks incident light from affecting the semiconductor pattern 34. Due to the possibility of misalignment during attachment of the upper and lower substrates 5 and 22, the black matrix 6 has a margin of error to compensate for the misalignment. Thus, an aperture ratio of the LCD is reduced. When misalignment during attachment of the upper and lower substrates 5 and 22 is more than the margin of error, some of the first and second distances A and B are not covered by the black matrix 6 so that light leakage occurs. Therefore, display quality of the LCD is reduced.

SUMMARY OF THE INVENTION

Accordingly, the present invention is directed to a substrate for a liquid crystal display (LCD) device and a fabricating method thereof that substantially obviate one or more of problems due to limitations and disadvantages of the related art.

An object of the present invention is to provide a substrate for a liquid crystal display (LCD) device and a fabricating method thereof that can increase an aperture ratio and leakage of light.

Another object of the present invention is to provide a substrate for a liquid crystal display (LCD) device and a fabricating method thereof to prevent light leakage.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a substrate for a liquid crystal display (LCD) device includes: gate and data lines crossing each other to define a pixel region on a substrate; a thin film transistor adjacent to where the gate and data lines cross, the a thin film transistor including a gate electrode, a semiconductor pattern, a source electrode and a drain electrode; a black matrix corresponding to the gate and data lines and the thin film transistor; a first insulating layer disposed on the black matrix and including first and second portions, the first portion corresponding to the pixel region and having a first thickness, and the second portion having a second thickness smaller than the first thickness; a color filter pattern disposed on the first insulating layer and corresponding to the first portion; and a pixel electrode disposed over the color filter pattern and being connected with the thin film transistor.

In another aspect, a fabricating method of a substrate for a liquid crystal display (LCD) device includes: forming gate and data lines crossing each other to define a pixel region; forming a thin film transistor adjacent to where the gate and data lines cross, the thin film transistor including a gate electrode, a semiconductor pattern, a source electrode and a drain electrode; forming a black matrix corresponding to the gate and data lines and the thin film transistor; forming a first insulating layer on the black matrix; forming a color filter pattern on the first insulating layer corresponding to the pixel region; partially removing the first insulating layer using the color filter pattern as a mask such that the first insulating layer includes a first portion corresponding to the color filter pattern that is thicker than a second portion; and forming a pixel electrode on the color filter pattern and connected with the thin film transistor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments, examples of which are illustrated in the accompanying drawings.

Figure 1:
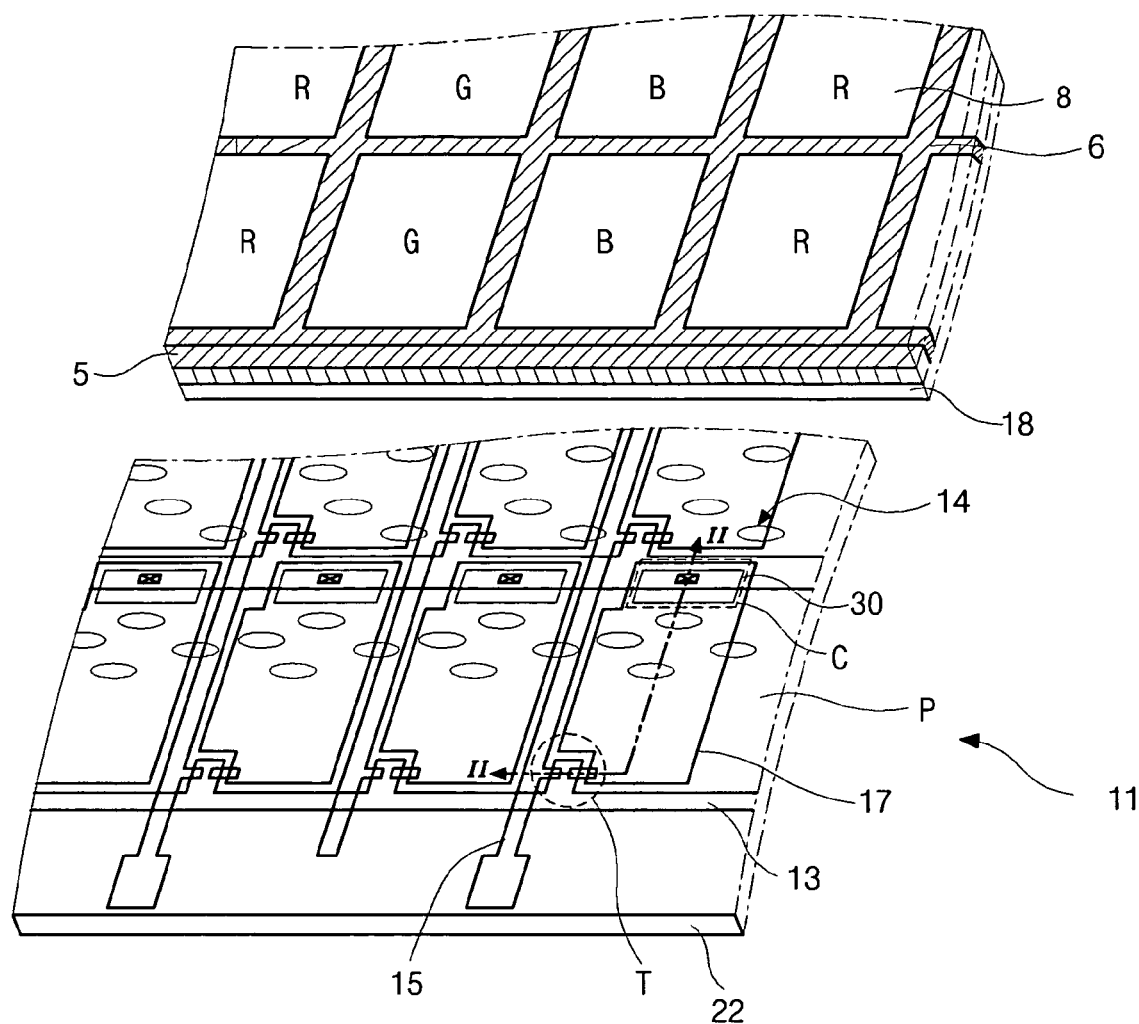
FIG. 1 is a perspective view of an LCD device according to the related art.
Figure 2:
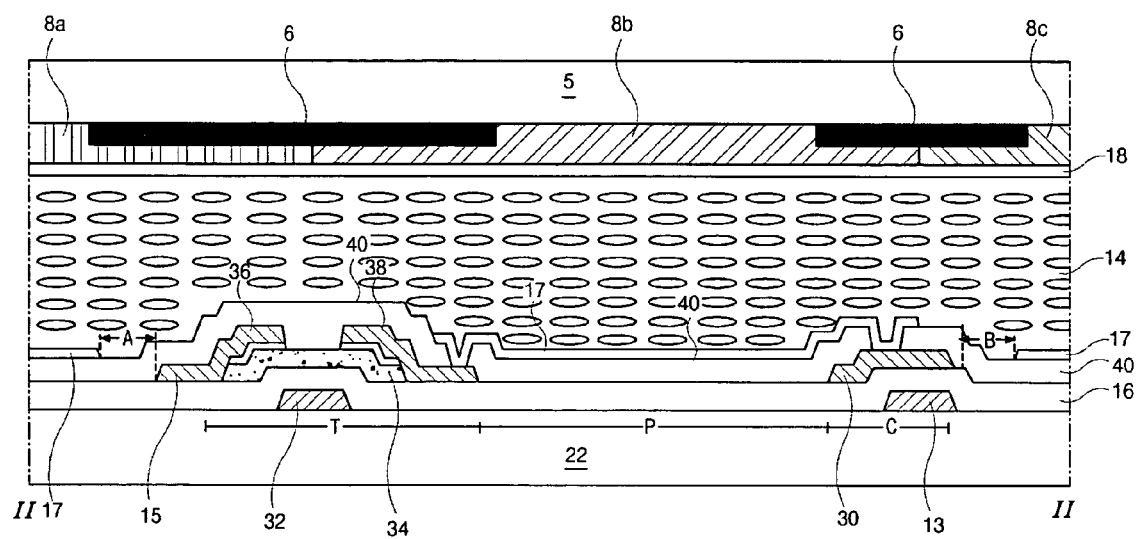
FIG. 2 is a cross-sectional view taken along a line II-II of FIG. 1.
Figure 3A:
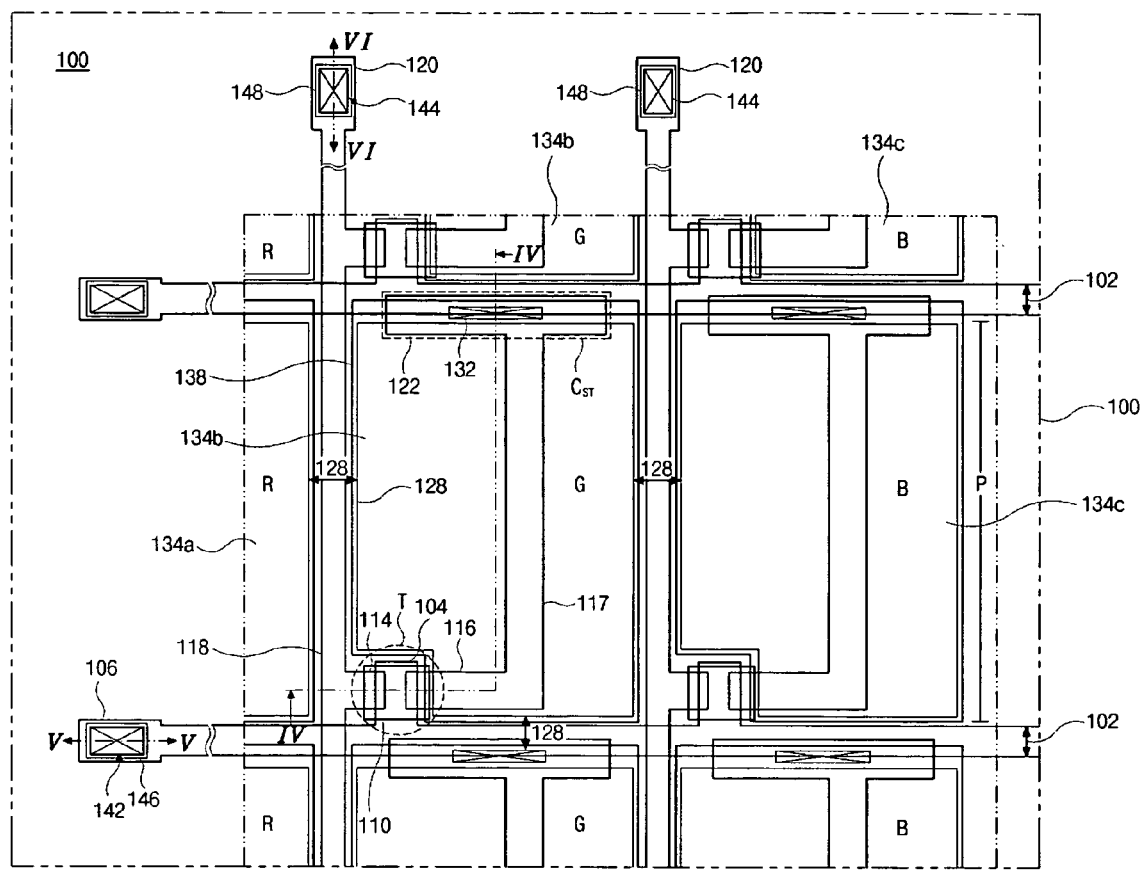
FIGS. 3A and 3B are plan views of a substrate for a liquid crystal display (LCD) device according to first and second embodiments of the present invention, respectively.
Figure 3B:
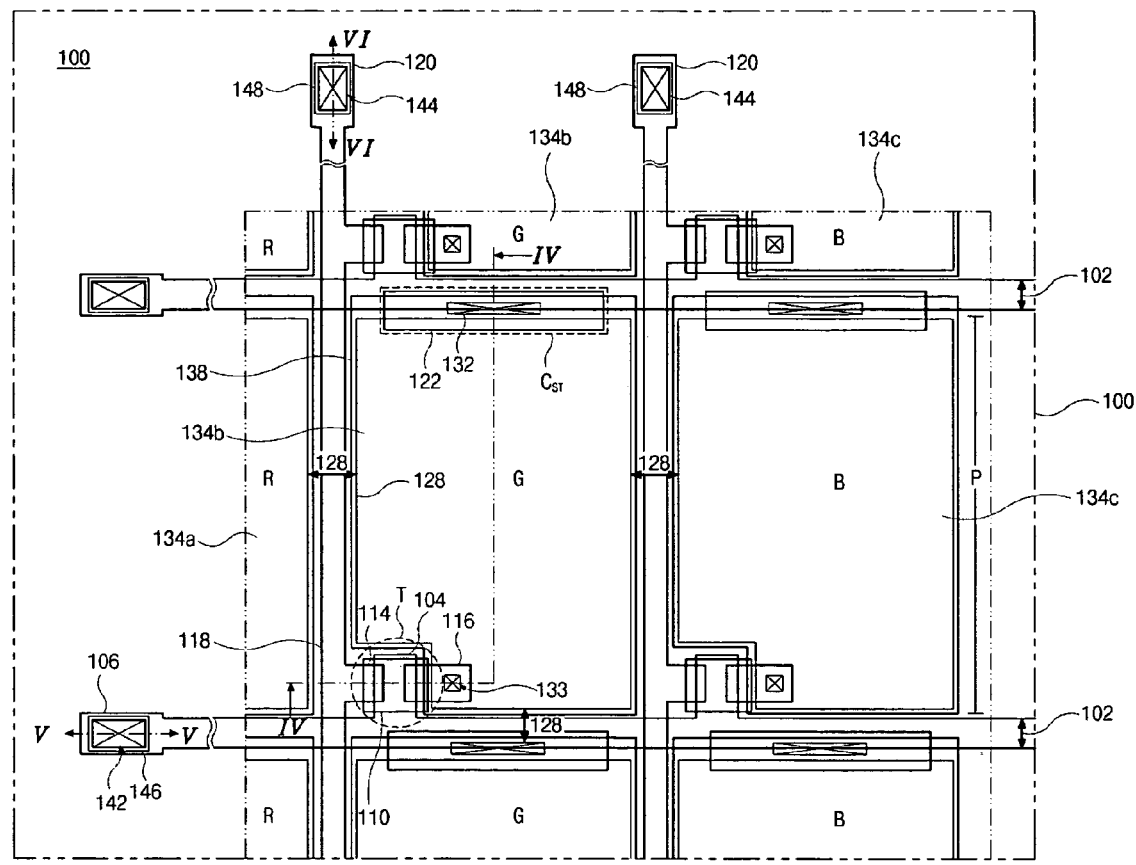

FIGS. 3A and 3B are plan views of a substrate for a liquid crystal display (LCD) device according to first and second embodiments of the present invention, respectively. As shown in FIG. 3A, a gate line 102 and a data line 118 are formed on a substrate 100 and cross each other to define a pixel region P. A gate pad electrode 106 connected with the gate line 102 is disposed at one end of the gate line 102. A data pad electrode 120 connected with the data line 118 is disposed at one end of the data line 118. The gate pad electrode 106 and the data pad electrode 120 have a gate pad contact hole 142 and a data pad contact hole 144, respectively, and contacts a gate pad terminal 146 and a data pad terminal 148 through the gate pad contact hole 142 and the data pad contact hole 144, respectively.

A thin film transistor T is disposed adjacent to where the gate line 102 and the data line 118 cross. The thin film transistor T in each pixel region P includes a gate electrode 104, a semiconductor pattern 110, a source electrode 114 and a drain electrode 116. A pixel electrode 138 is connected with the drain electrode 116. A red color filter pattern (R) 134a, a green color filter pattern (G) 134b and a blue color filter pattern (B) 134c are respectively formed in the pixel regions P.

A connecting line 117 connects the drain electrode 116 with a storage electrode 122 in the pixel region P. The storage electrode 122 and the gate line 102 overlapping the storage electrode 122 define a storage capacitor Cst. The storage electrode 122 contacts the pixel electrode 138 through a storage contact hole 132. Accordingly, the pixel electrode 138 is connected with the drain electrode 116 through the connecting line 117 and the storage electrode 122, and thus a data signal can be applied to the pixel electrode 138 through the thin film transistor T. The substrate for the LCD device in FIG. 3A may be referred to as a color filter on Transistor (COT) substrate since the color filter patterns 134a, 134b and 134c are disposed on the thin film transistors T.

A black matrix 128 may be disposed over the thin film transistor T. The black matrix 128 corresponding to the gate line 102, the data line 118 and the thin film transistor T prevents light leakage. Further, the black matrix 128 protects the thin film transistor T.

The substrate according to the second embodiment of FIG. 3B is similar to the substrate according to the first embodiment of FIG. 3A, except for the connection of the drain electrode 116 and the pixel electrode 138. Instead of the pixel electrode 138 being connected with the drain electrode 116 through the connecting line 117 and the storage electrode 122 in FIG. 3A, the pixel electrode 138 in FIG. 3B directly contacts the drain electrode 116 through a drain contact hole 133. In other words, the connecting line 117 in FIG. 3A is not used to connect the pixel electrode 138 and the drain electrode 116 in the second embodiment since the drain contact hole 133 is formed on the drain electrode 116. Further, the storage electrode 122 in FIG. 3B has an island shape.

FIGS. 4A to 4G, 5A to 5G, and 6A to 6G are cross-sectional views, which are taken along lines IV-IV, V-V and VI-VI of FIG. 3A, respectively, of a fabricating method of a substrate for an LCD according to the first embodiment of the present invention. The fabricating method according to the first embodiment can be similarly applied according to the second embodiment, except for a method connecting the pixel electrode and the drain electrode.

Figure 4A:
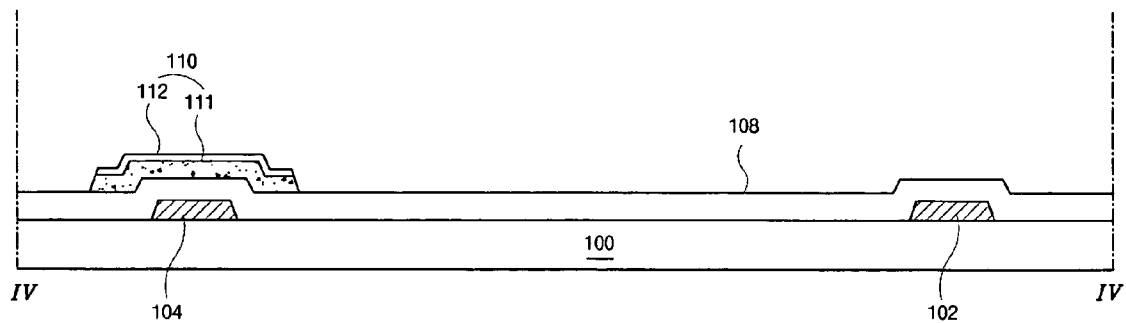
FIGS. 4A to 4G, 5A to 5G, and 6A to 6G are cross-sectional views, which are taken along lines IV-IV, V-V and VI-VI of FIG. 3A, respectively, of a fabricating method of a substrate for an LCD according to an embodiment of the present invention.
Figure 5A:
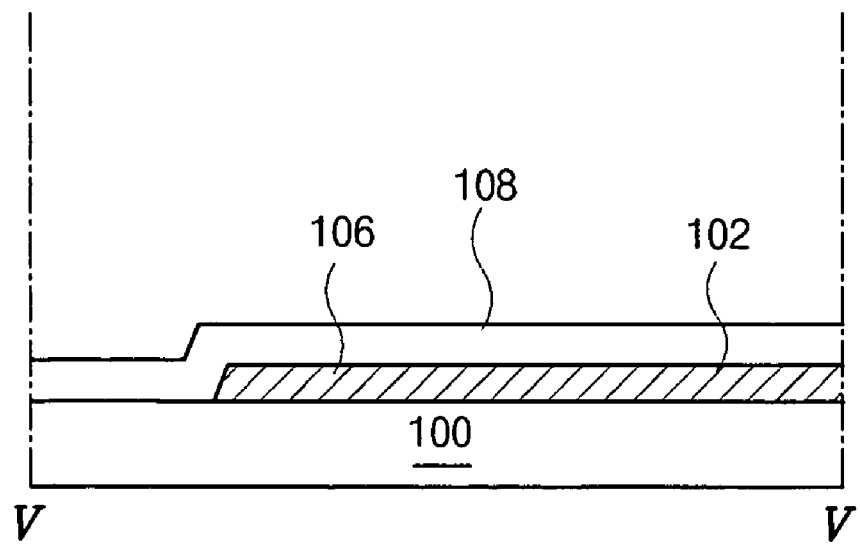
Figure 6A:
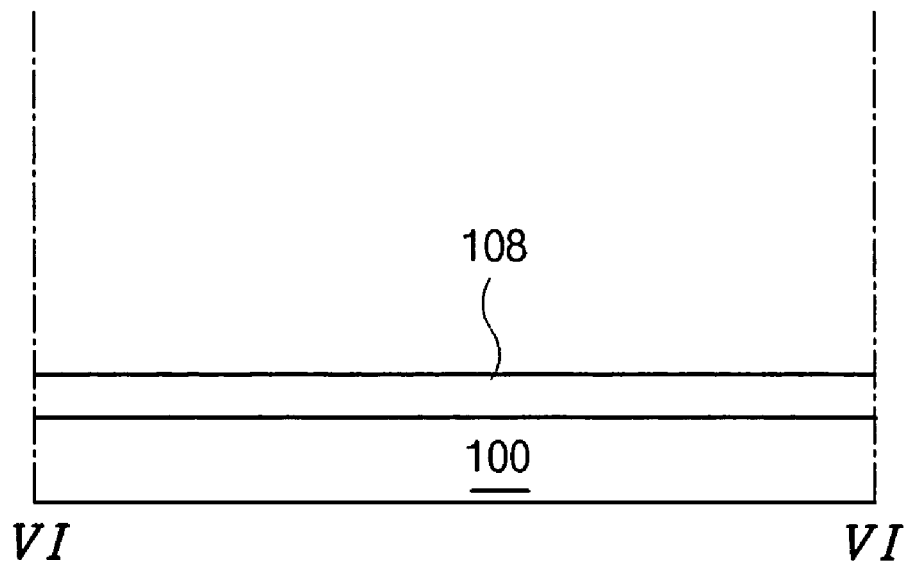

In FIGS. 4A, 5A and 6A, a first metal is deposited on a substrate 100 and patterned to form a gate line 102, a gate pad electrode 106 at one end of the gate line 102, and a gate electrode 104 protruding from the gate line 102. The first metal may be a low resistance material, such as aluminum (Al), to prevent signal delay. A first insulating layer 108 is formed over the substrate 100 as a gate insulating layer 108. The first insulating layer 108 may be made of silicon oxide ($SiO_2$) or silicon nitride ($SiN_x$). Intrinsic amorphous silicon and doped amorphous silicon are subsequently deposited on the first insulating layer 108. The intrinsic amorphous silicon and doped amorphous silicon are patterned to form a semiconductor pattern 110 having an active layer 111 and an ohmic contact layer 112.

Figure 4B:
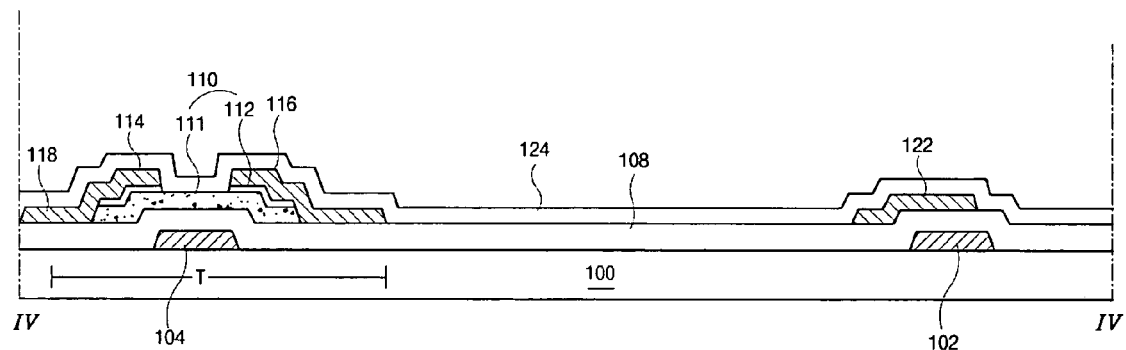
Figure 5B:
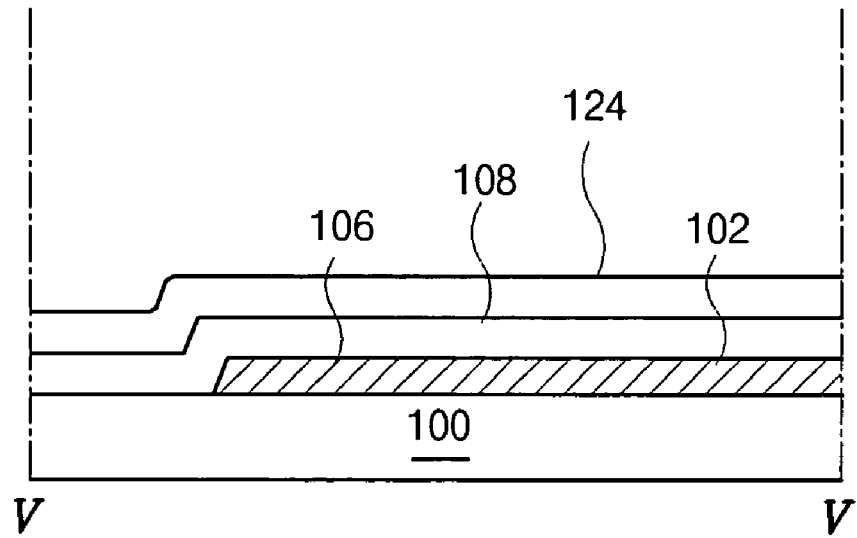
Figure 6B:
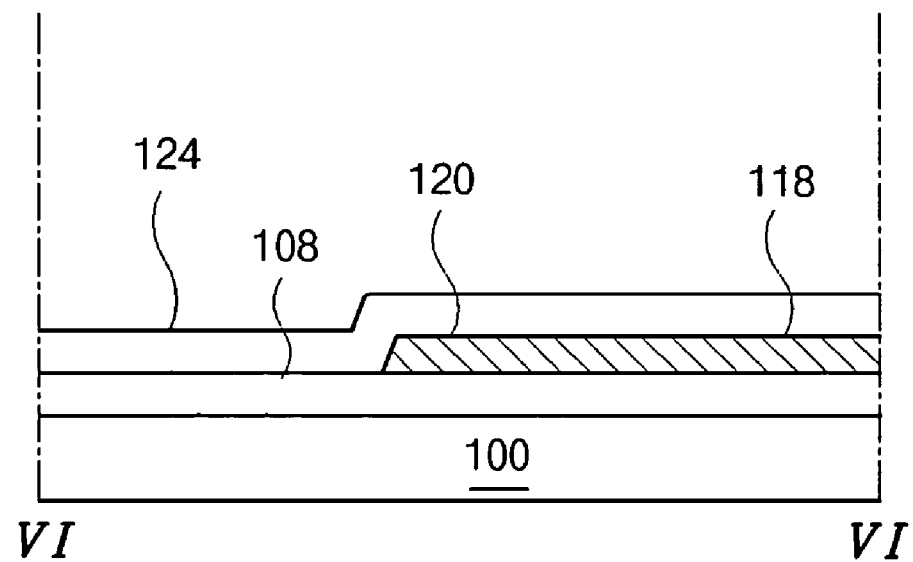

As shown in FIGS. 4B, 5B and 6B, a second metal is deposited over the substrate 100 having the semiconductor pattern 110 and patterned to form a data line 118, a data pad electrode 120 at one end of the data line 118, a source electrode 114, a drain electrode 116, a connecting line 117 and a storage electrode 122. The source and drain electrodes 114 and 116 are spaced apart from each other, and contact the ohmic contact layer 112. The second metal may be chromium (Cr), molybdenum (Mo), tungsten (W), titanium (Ti), or copper (Cu). As shown in FIG. 3A, the connecting line 117 is formed in the first embodiment. However, as shown in FIG. 3B, the connecting line 117 is not formed in the second embodiment and the storage electrode 122 has an island shape.

After the source and drain electrodes 114 and 116 are formed, the ohmic contact layer 112 is etched using the source and drain electrodes 114 and 116 as an etching mask. Thus, the ohmic contact layer 112 is separated into two layers. The region of the active layer 111 exposed through the etching process for the ohmic contact layer 112 is a channel region. Then, a second insulating layer 124 is formed on the substrate 100 having the source and drain electrodes 114 and 116. The second insulating layer 124 may be made of silicon oxide ($SiO_2$) or silicon nitride ($SiN_x$).

Figure 4C:
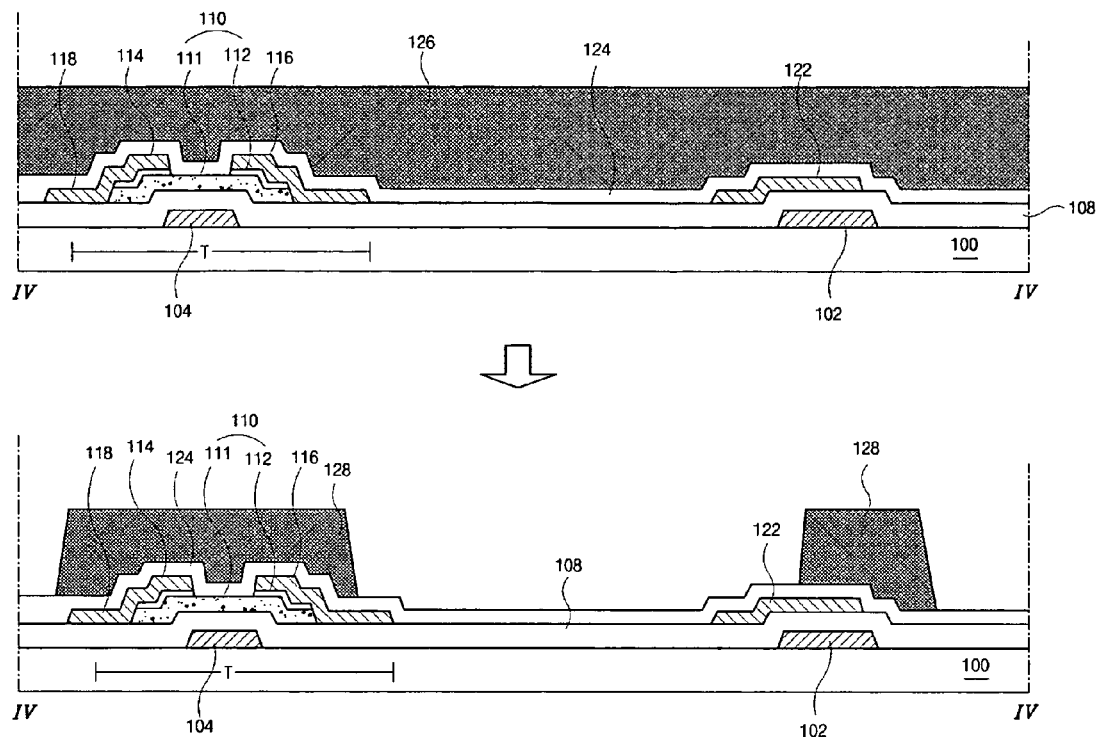
Figure 4C:
Figure 5C:
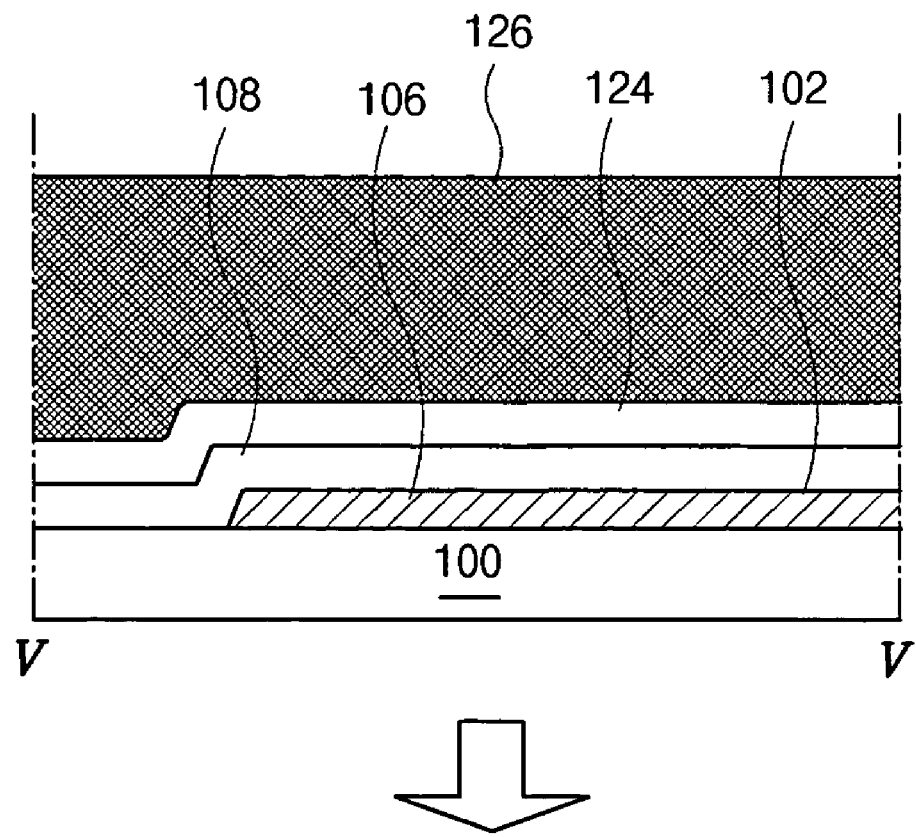
Figure 5C:
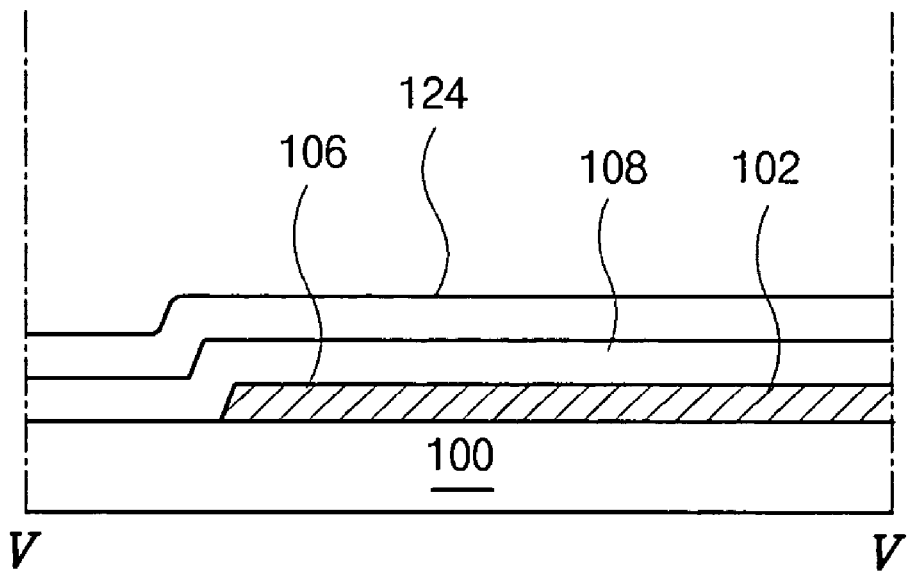
Figure 6C:
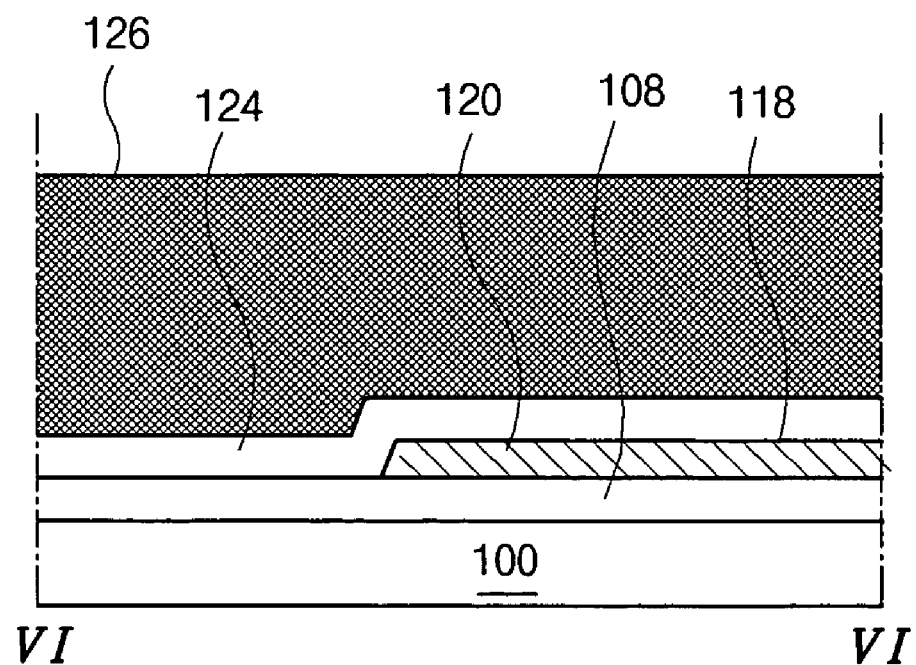
Figure 6C:
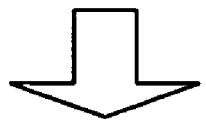
Figure 6C:
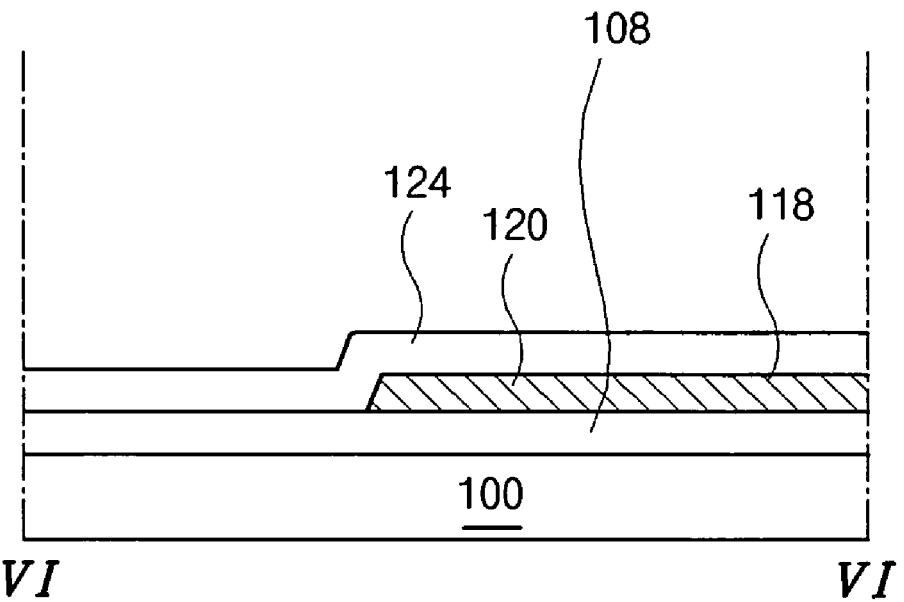

As shown in FIGS. 4C, 5C and 6C, an opaque material is deposited on the second insulating layer 124 and patterned to form a black matrix 128. The opaque material may be a low dielectric organic material. The black matrix 128 corresponds to the gate line 102, the data line 118 and the thin film transistor T. The second insulating layer 124 increases adhesion of the black matrix 128 to the thin film transistor T. The black matrix 128 shields the thin film transistor T from incident light.

Figure 4D:
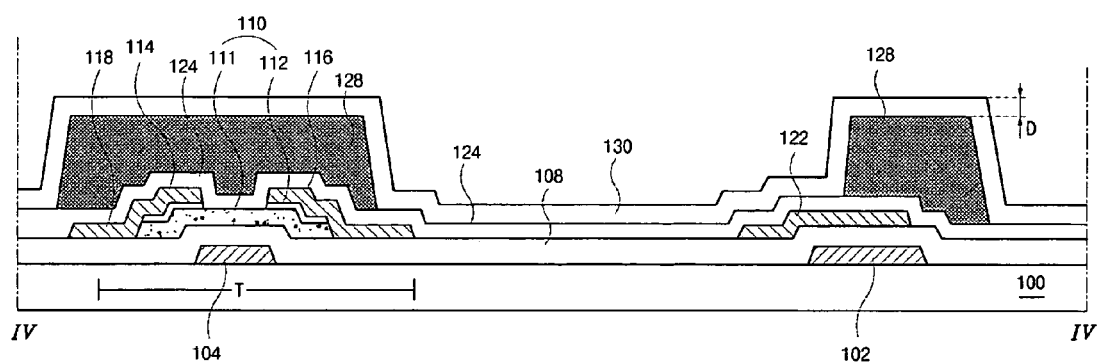
Figure 5D:
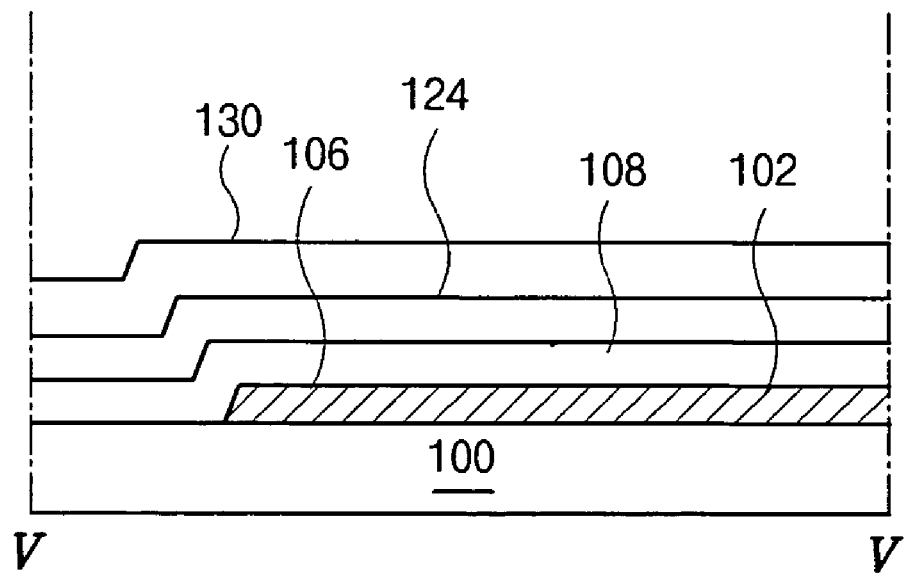
Figure 6D:
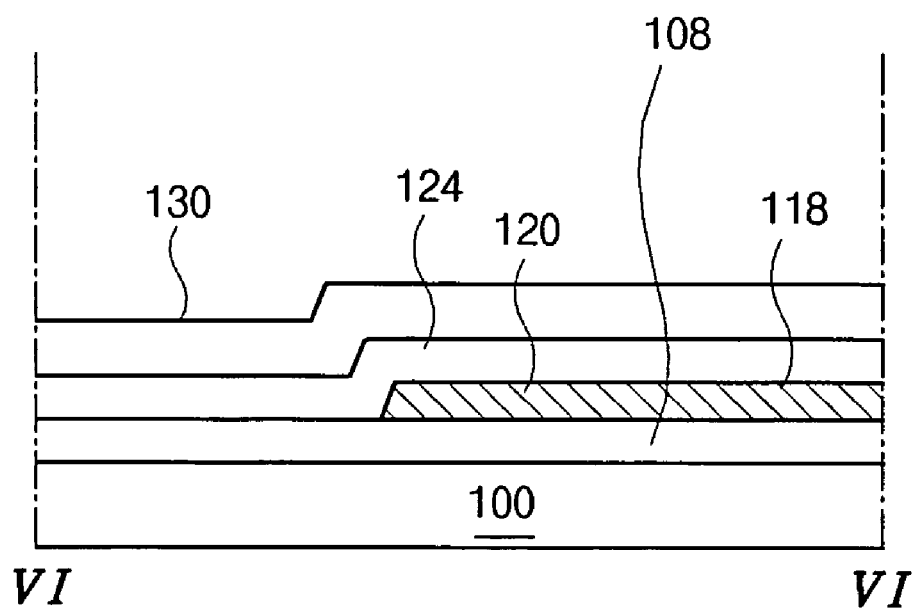

As shown in FIGS. 4D, 5D and 6D, a third insulating layer 130 is formed on the substrate 100 having the black matrix 128. The third insulating layer 130 may be made of silicon oxide ($SiO_2$) or silicon nitride ($SiN_x$), and have a thickness D.

Figure 4E:
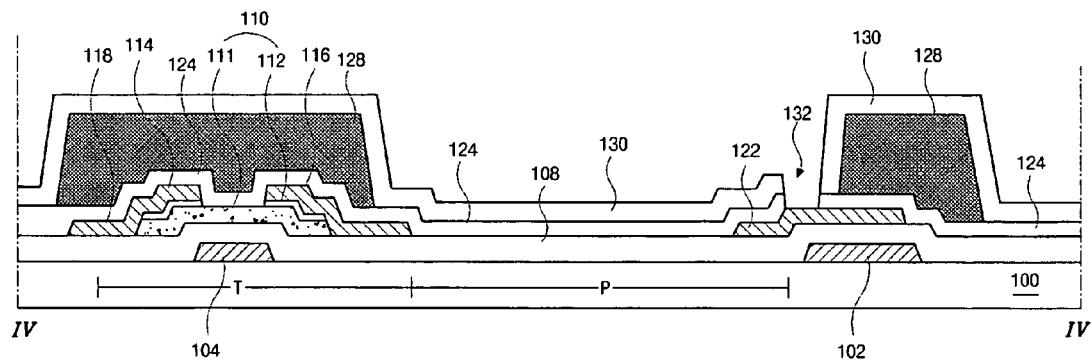
Figure 5E:
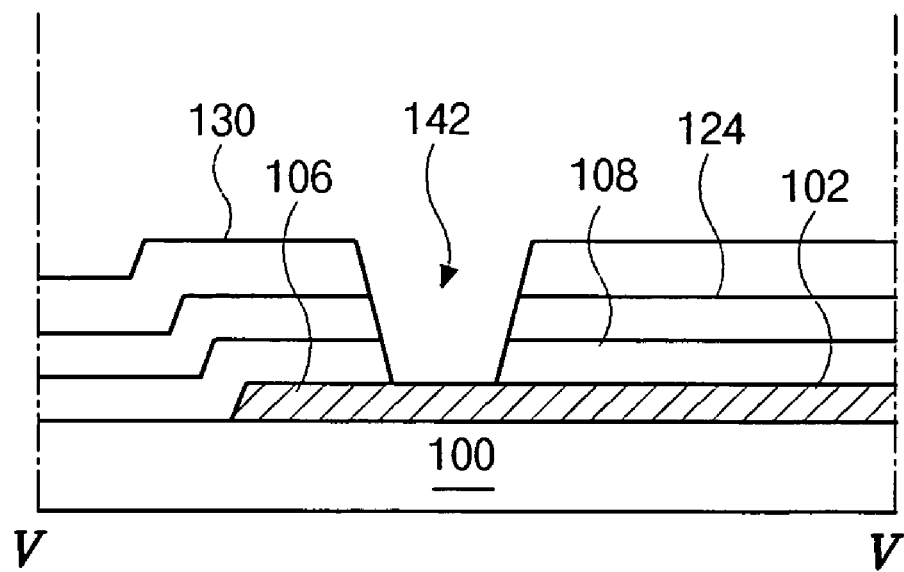
Figure 6E:
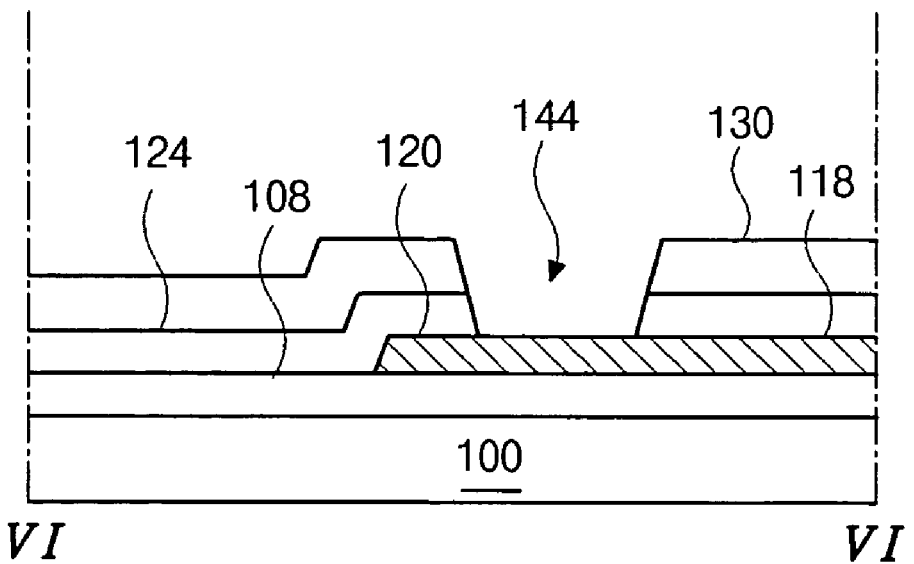

As shown in FIG. 4E, the third and second insulating layers 130 and 124 are patterned to form a storage contact hole 132 exposing the storage electrode 122, and a data pad contact hole 144 exposing the data pad electrode 120, as shown in FIG. 6E. Further, the third, second and first insulating layers 130, 124 and 108 are patterned to form a gate pad contact hole 142 exposing the gate pad electrode 106, as shown in FIG. 5E. As shown in FIG. 3B, this patterning also forms the drain contact hole 133 exposing the drain electrode 116 as well as the storage contact hole 132 formed in the second embodiment.

Figure 4F:
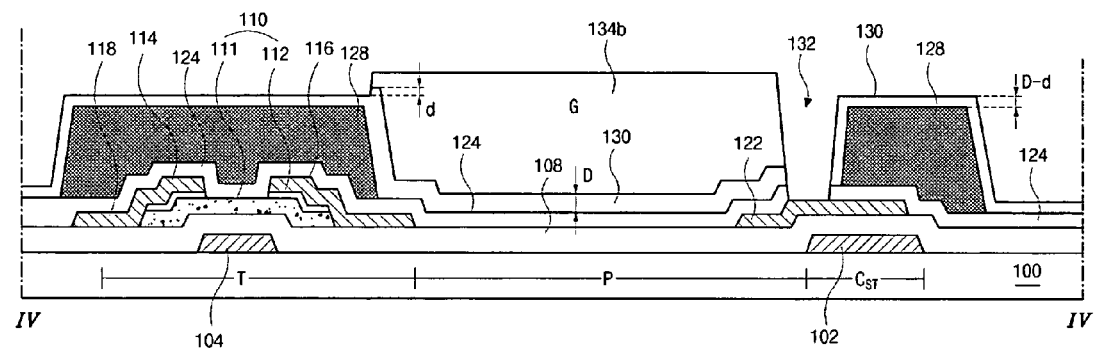
Figure 5F:
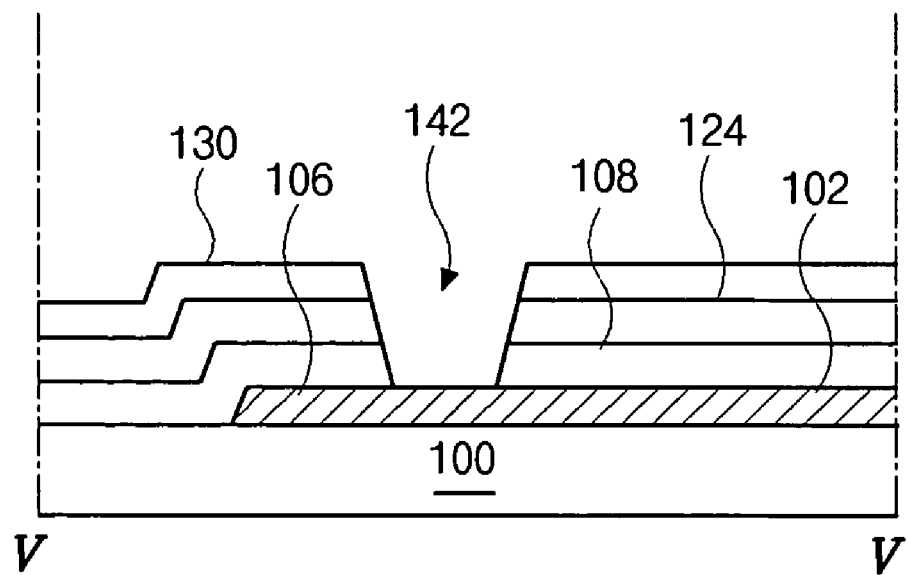
Figure 6F:
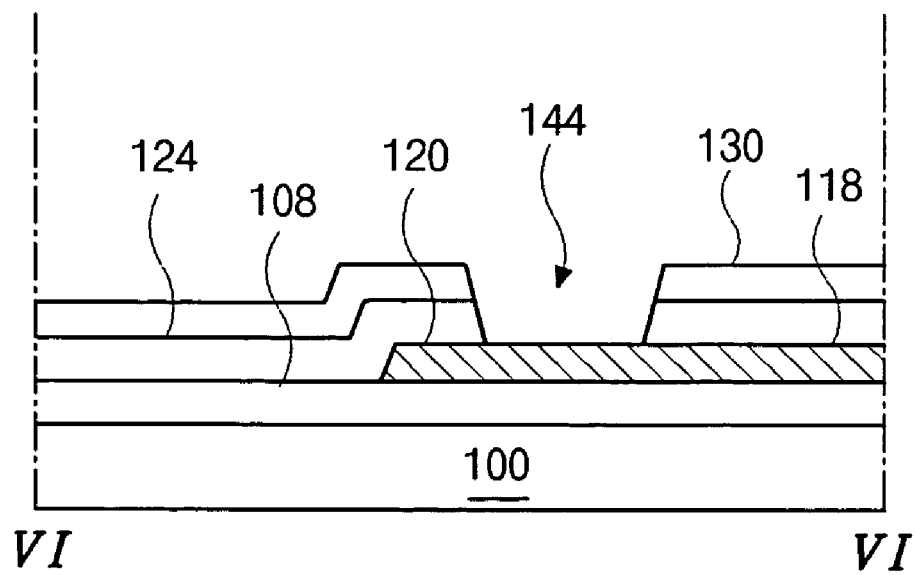

In FIGS. 4F, 5F and 6F, a green color resin is deposited on the patterned third insulating layer 130 and patterned to form a green color filter pattern (G) 134b in the pixel region P. The red and blue color filter patterns (R and B) 134a and 134c in FIG. 3A are formed in similar processes to the green color filter pattern 134b.

After the red, green and blue color filter patterns 134a, 134b and 134c are formed, the third insulating layer 130 exposed through the color filter patterns 134a, 134b and 134c is partially removed to a depth d. The depth d may be more than an average surface roughness of the third insulating layer 130. The average surface roughness may be the root mean square (RMS) of surface roughnesses of the third insulating layer 130. The partial removal of the third insulating layer 130 is done by a dry-etching process or wet-etching process.

Accordingly, a first portion of the third insulating layer 130 covered by the color filter patterns 134a, 134b and 134c has a thickness D, and a second portion of the third insulating layer 130 exposed through the color filter patterns 134a, 134b and 134c has a thickness D-d. In the process of partially removing the third insulating layer 130, the color filter patterns 134a, 134b and 134c act as etching masks.

Figure 4G:
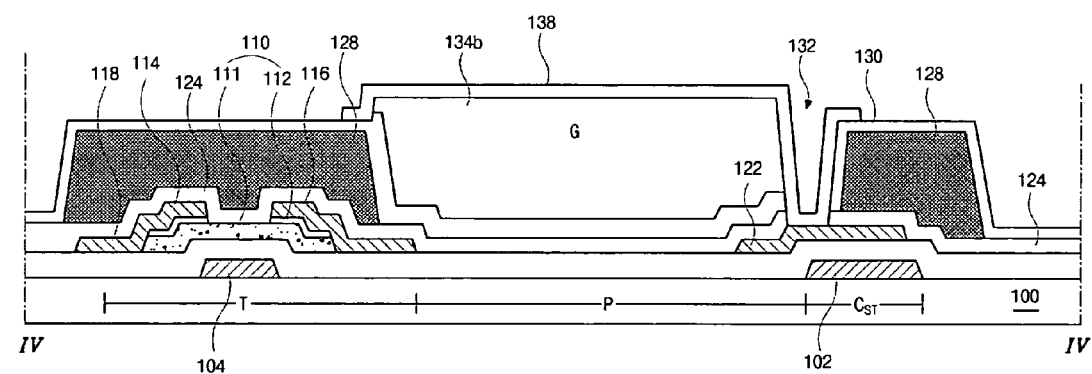
Figure 5G:
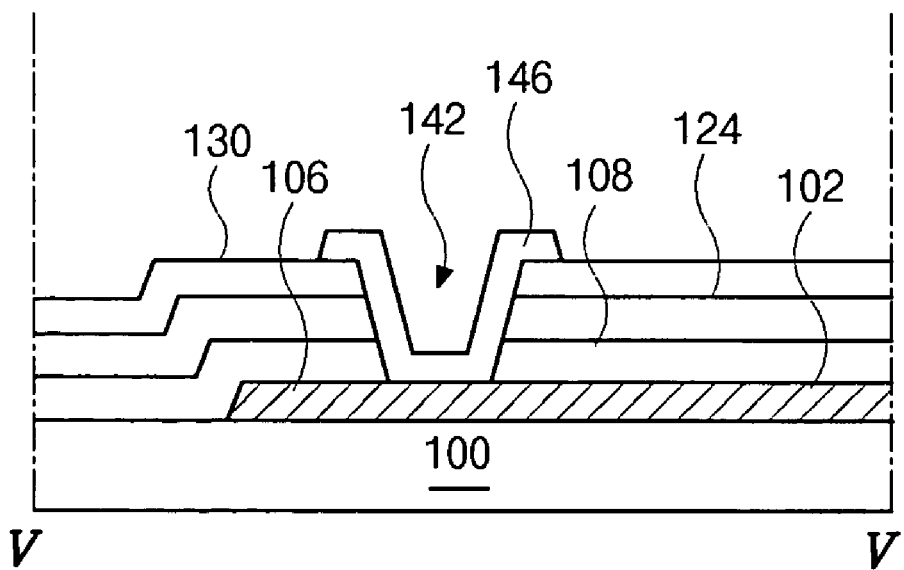
Figure 6G:
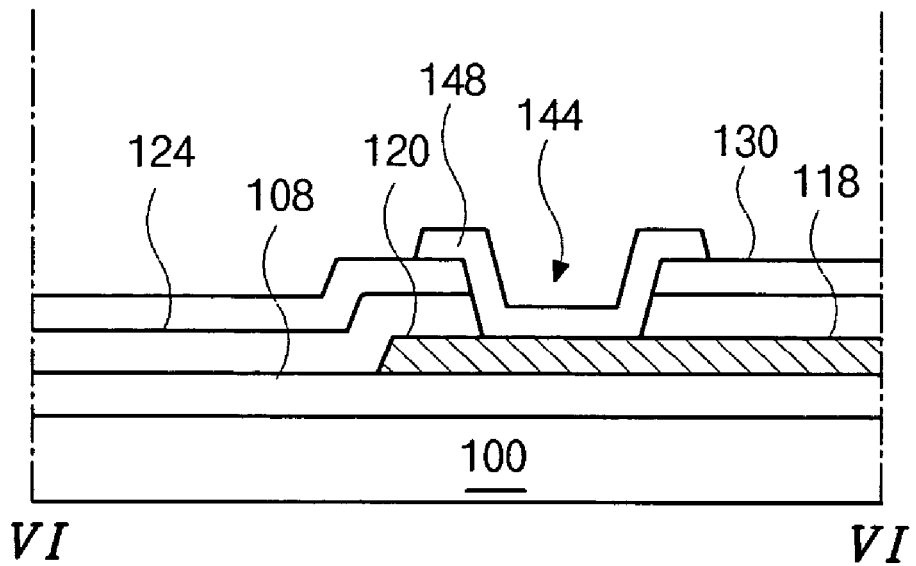

As shown in FIGS. 4G, 5G and 6G, a transparent conductive material is deposited on the substrate 100 having the color filter patterns 134a, 134b and 134c and patterned to form a pixel electrode 138 in the pixel region P, a gate pad terminal 146 on the gate pad electrode 102, and a data pad terminal 148 on the data pad electrode 120. The transparent conductive material may be indium-tin-oxide (ITO) or indium-zinc-oxide (IZO). The pixel electrode 138 contacts the storage electrode 122 through the storage contact hole 132, the gate pad terminal 146 contacts the gate pad electrode 106 through the gate pad contact hole 142, and the data pad terminal 148 contacts the data pad electrode 120 through the data pad contact hole 144. As shown in FIG. 4G, the pixel electrode 138 is connected with the drain electrode 116 through the connecting line 117 and the storage electrode 122 in accordance with the first embodiment. However, as shown in FIG. 3B, the connecting line 117 is not formed, and the pixel electrode 138 directly contacts the drain electrode 116 through the drain contact hole 133 in the second embodiment.

Through the process of partially removing the third insulating layer 130 in the above fabricating method, residual color resins remaining in the storage contact hole 132, the gate pad contact hole 142 and the data pad contact hole 144 can be removed. Additionally, adhesion of the pixel electrode 138, the gate pad terminal 146 and the data pad terminal 148, and the layers therebelow, such as the third insulating layer 130, can be improved.

FIGS. 7A to 7G, 8A to 8G, and 9A to 9G are cross-sectional views of processes for partially removing a third insulating layer according to the first embodiment of the present invention. The detail processes of partially removing a third insulating layer according to the first embodiment can be applied similarly to the third insulating layer according to the second embodiment, except for the connection of a pixel electrode and a drain electrode.

Figure 7A:
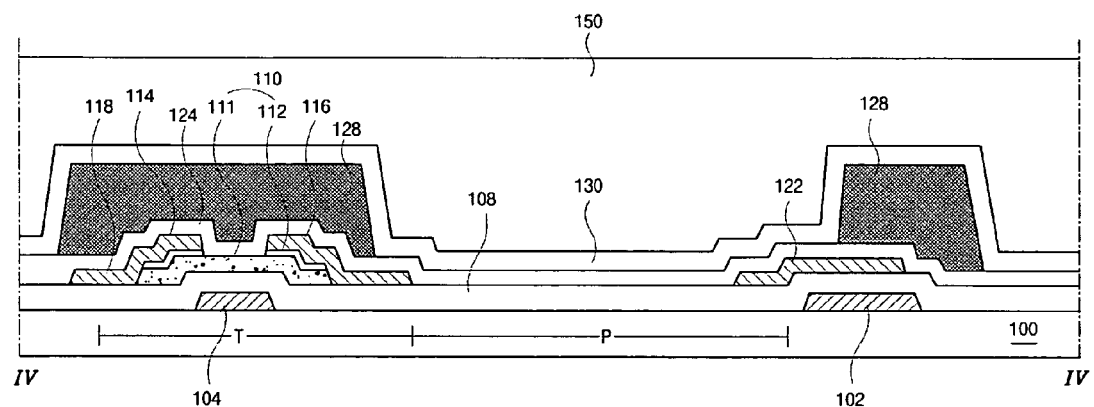
FIGS. 7A to 7G, 8A to 8G, and 9A to 9G are cross-sectional views of detail processes for partially removing a third insulating layer according to an embodiment of the present invention.
Figure 8A:
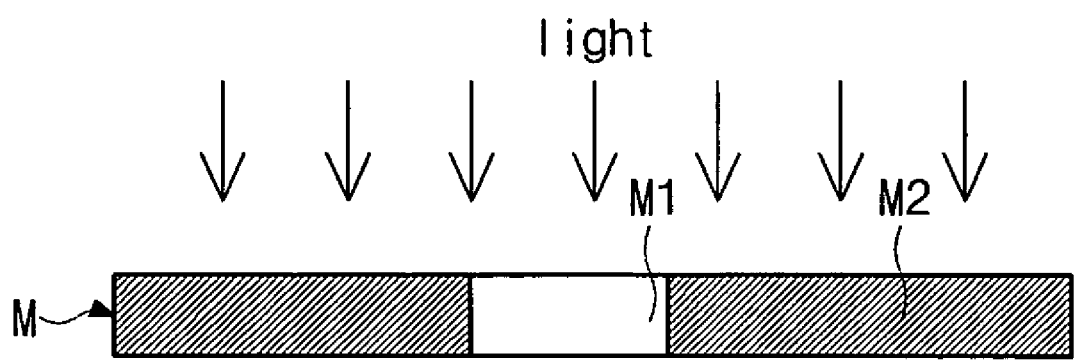
Figure 8A:
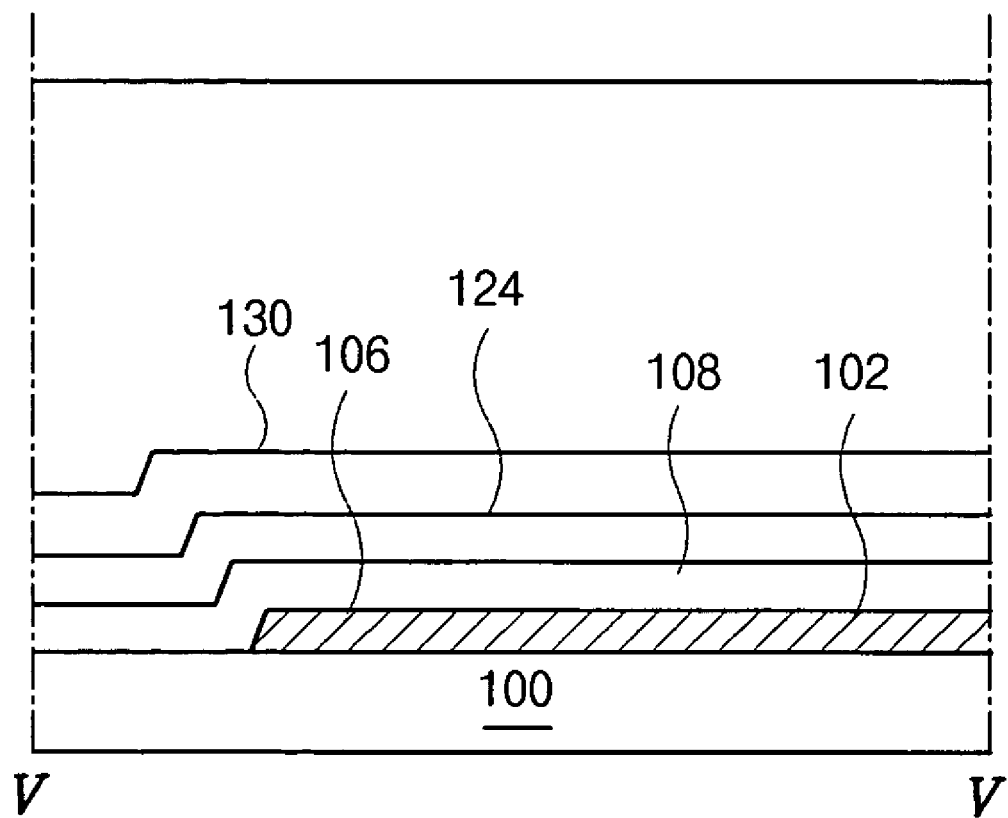
Figure 9A:
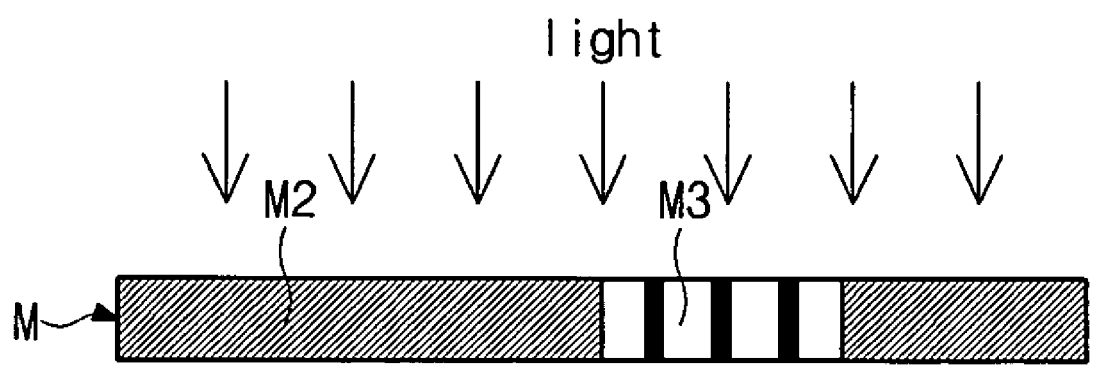
Figure 9A:
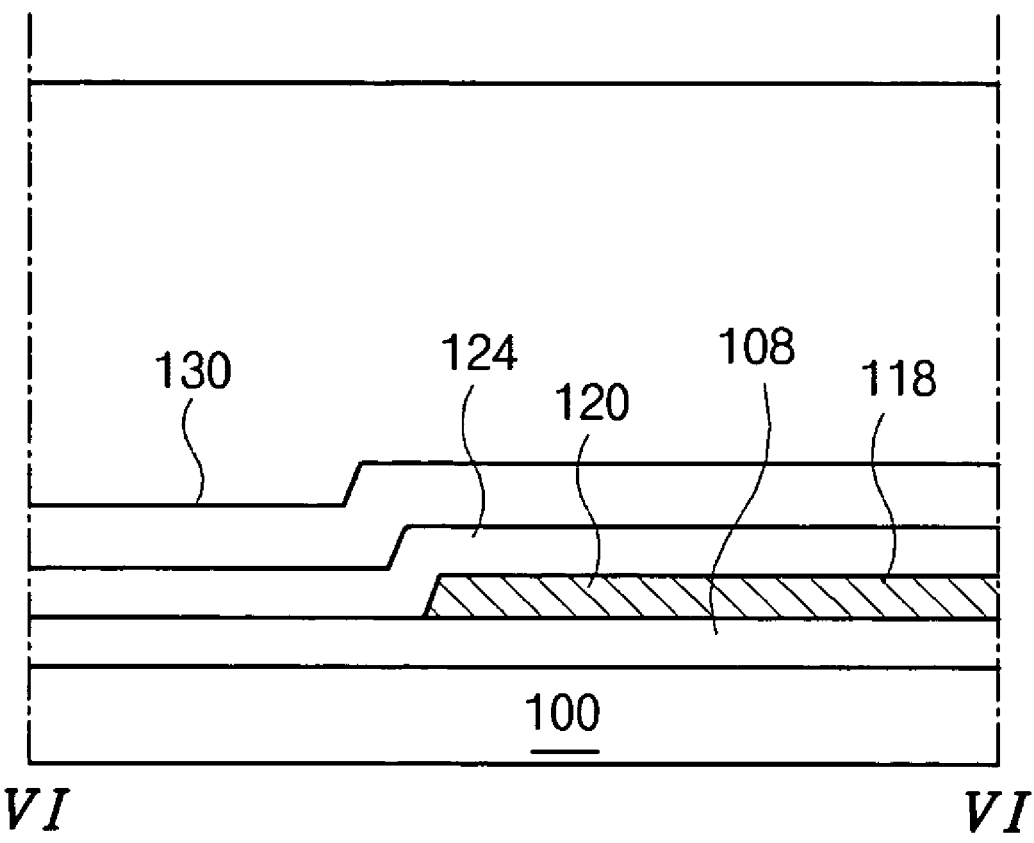

As shown in FIGS. 7A, 8A and 9A, a photo-resist 150 is deposited on a third insulating layer 130 having a thickness D, and a photo-mask M including a transparent portion M1, a blocking portion M2 and a semi-transparent portion M3 is disposed over the photo-resist 150. The transparent portion M1 transmits light, the blocking portion M2 blocks light, and the semi-transparent portion M3 transmits about half light than the transparent portion M1. The semi-transparent portion M3 may be made of slits or a semi-transparent material, and partially exposes the photo-resist 150. As the photo-resist 150 may be used a positive type photo-resist in which what is exposed will be developed.

The semi-transparent portion M3 corresponds to regions, where a storage contact hole and a data pad contact hole will be formed. The transparent portion M1 corresponds to a region, where a gate pad contact hole will be formed. In the second embodiment, the semi-transparent portion M3 further corresponds to a region, where a drain contact hole will be formed.

Figure 7B:
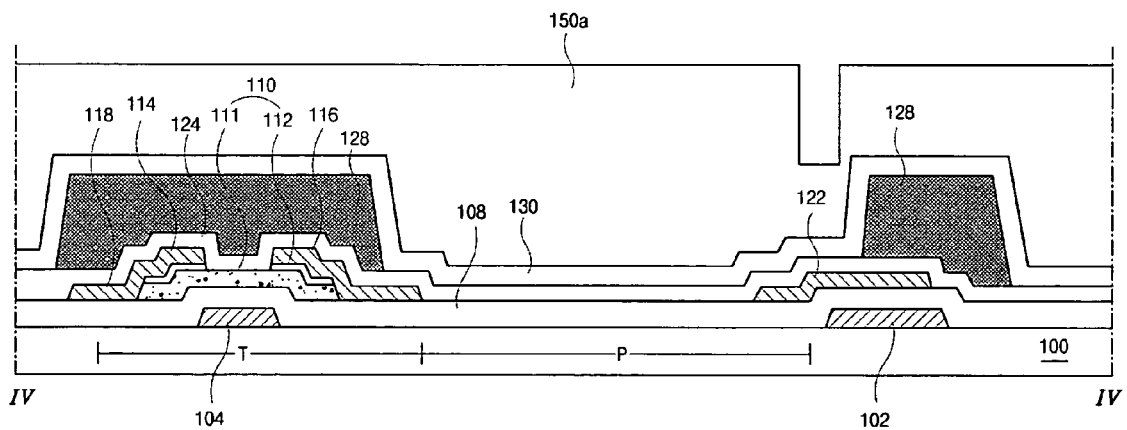
Figure 8B:
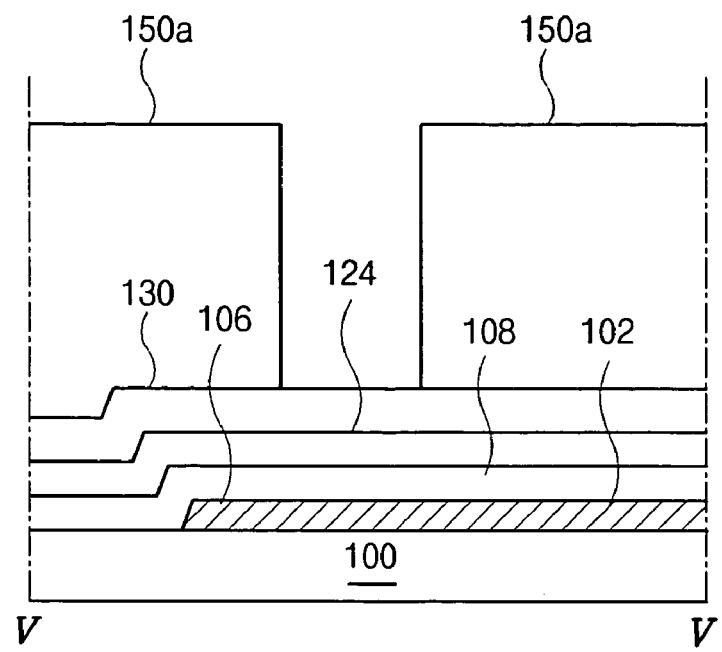
Figure 9B:
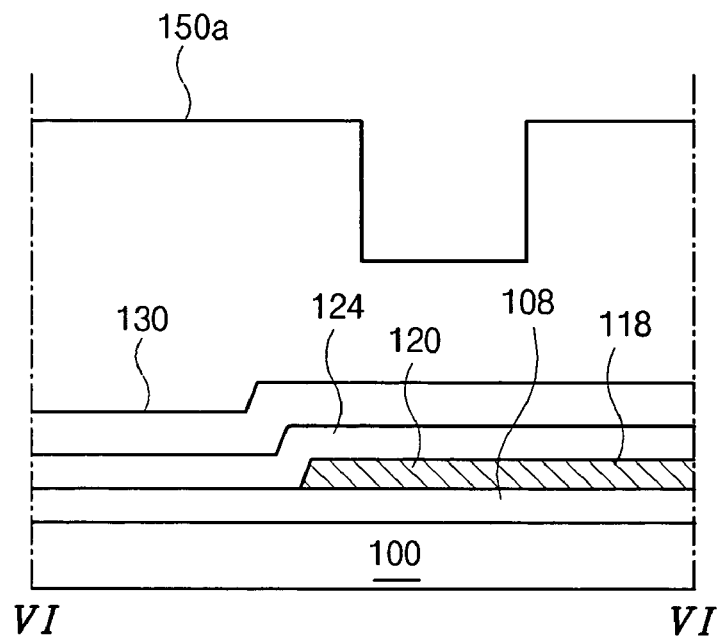

As shown in FIGS. 7B, 8B and 9B, a photo-resist pattern 150a is formed through the above exposure process and a developing process for the photo-resist 150 (in FIGS. 7A, 8A and 9A). A portion of the photo-resist pattern 150a corresponding to the semi-transparent portion M3 is partially removed, and a portion of the photo-resist pattern 150a corresponding to the transparent portion M1 is completely removed.

Figure 7C:
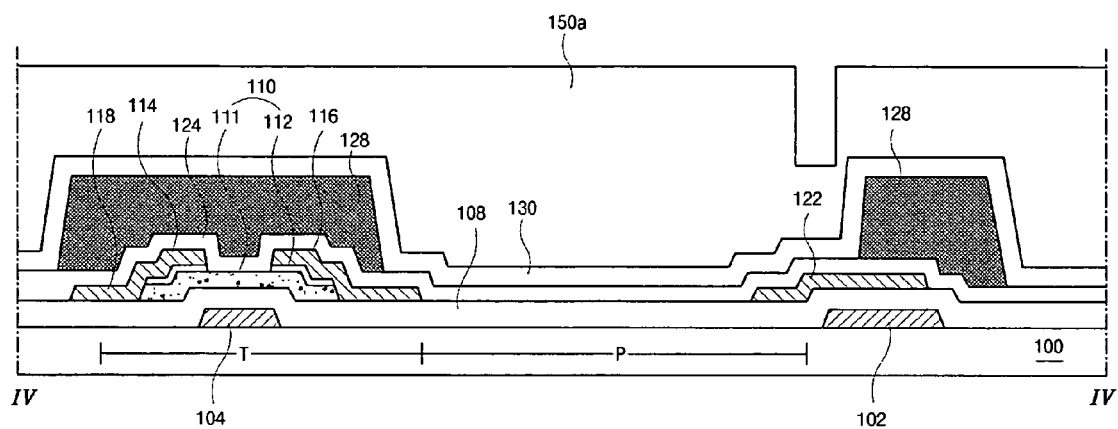
Figure 7D:
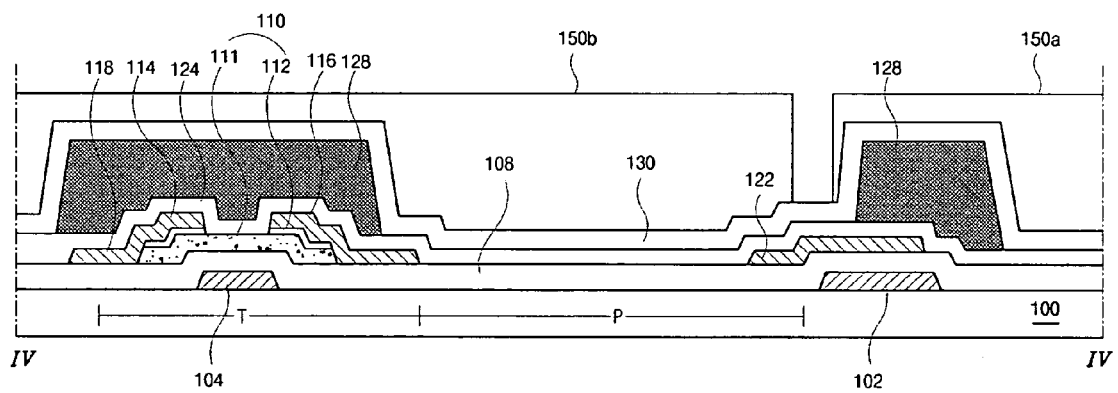
Figure 8C:
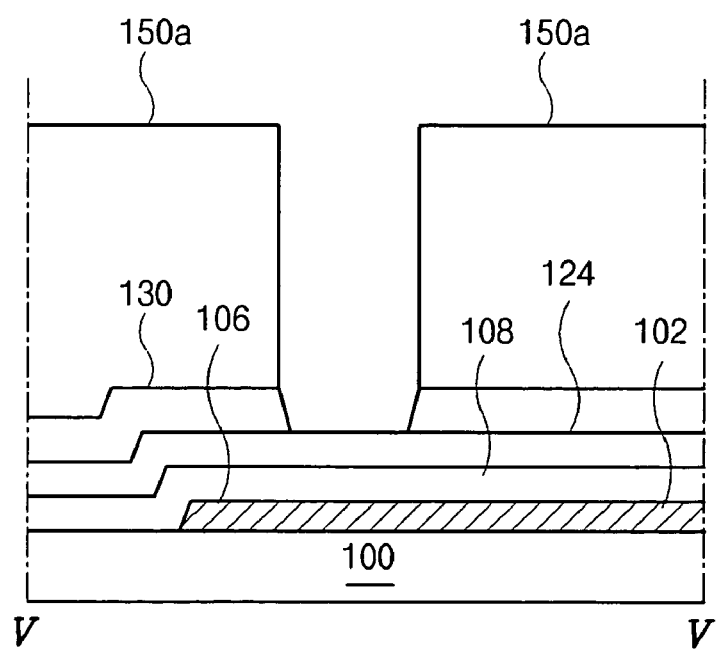
Figure 8D:
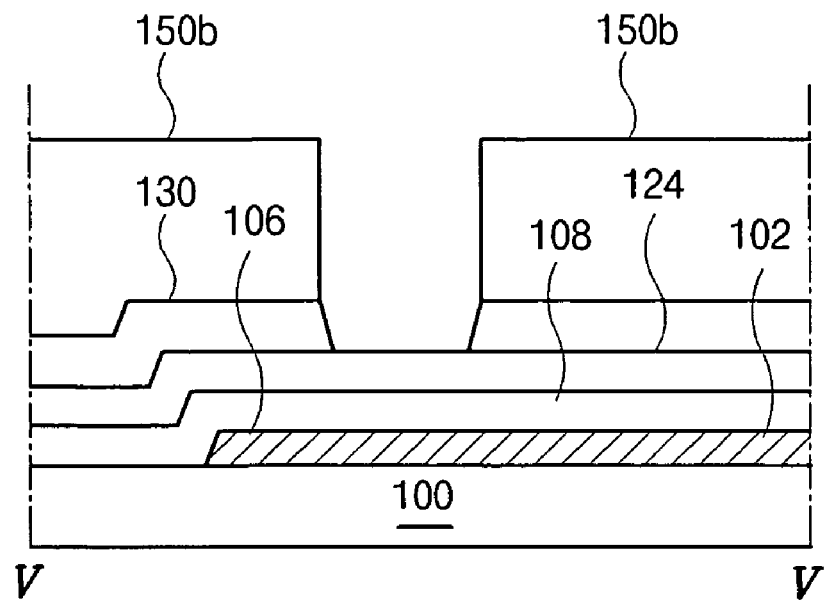
Figure 9C:
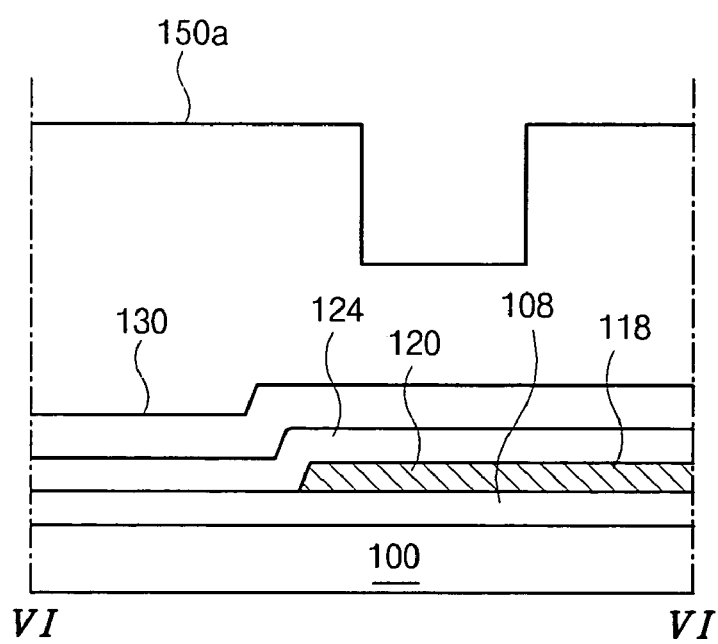
Figure 9D:
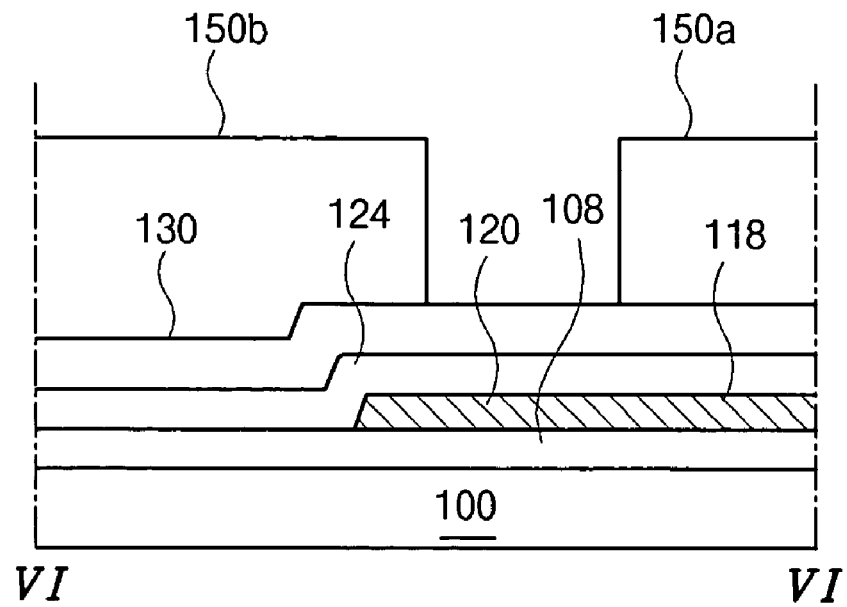

Referring to FIGS. 7C, 8C and 9C, the third insulating layer 130 over the gate pad electrode 106 is completely etched through the photo-resist pattern 150a. As shown in FIGS. 7D, 8D and 9D, the photo-resist pattern 150a (in FIGS. 7C, 8C and 9C) is ashed, and thus a reduced ashed photo-resist pattern 150b is formed. Accordingly, through an ashing, such as a dry-etching process, the third insulating layer 130 over the storage electrode 122 and the data pad electrode 120 is exposed through the ashed photo-resist pattern 150b. In the second embodiment, the third insulating layer 130 over the drain electrode 116 is also exposed.

Figure 7E:
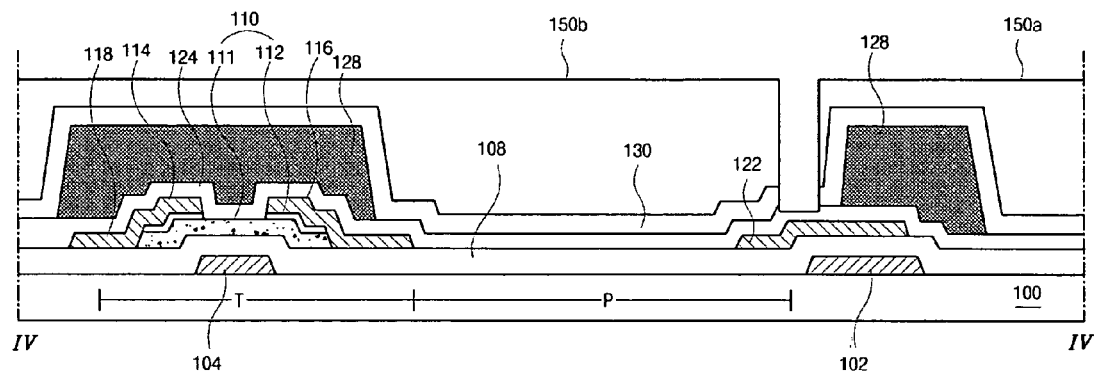
Figure 8E:
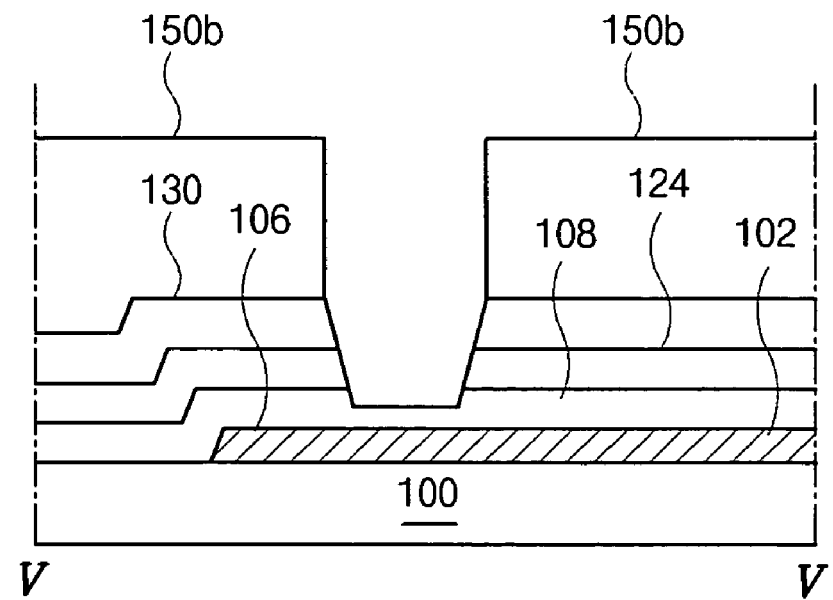
Figure 9E:
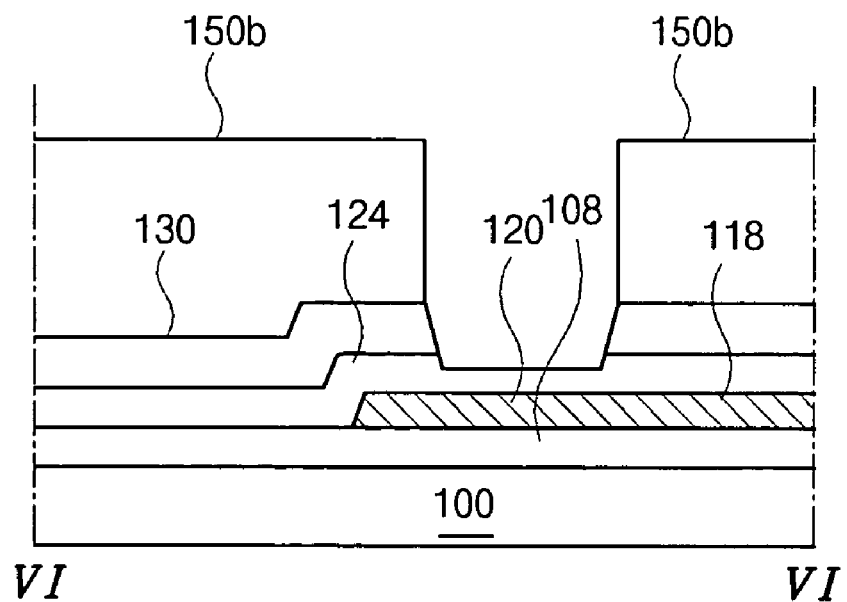

As shown in FIGS. 7E, 8E and 9E, the third and second insulating layers 130 and 124 over the storage electrode 122 and the data pad electrode 120, and the second and first insulating layers 124 and 108 over the gate pad electrode 106 are etched using the ashed photo-resist pattern 150b. In the etching process, the third insulating layer 130 over the storage electrode 122 and the data pad electrode 120 is completely etched, and the second insulating layer 124 over the storage electrode 122 and the data pad electrode 120 is partially etched. Further, the second insulating layer 124 over the gate pad electrode 106 is completely etched, and the first insulating layer 108 over the gate pad electrode 106 is partially etched. The reason for partially etching the second insulating layer 124 and the first insulating layer 108 is to prevent a chemical reaction, such as corrosion of metal layers below the first and second insulating layers 108 and 124 when the ashed photo-resist pattern 150b is stripped and a color filter pattern is formed. In the second embodiment, the third and second insulating layers 130 and 124 over the drain electrode 116 is etched in the method similar to the etching of the third and second insulating layer 130 and 124 over the storage electrode 122 and the data pad electrode 120 in the first embodiment.

Figure 7F:
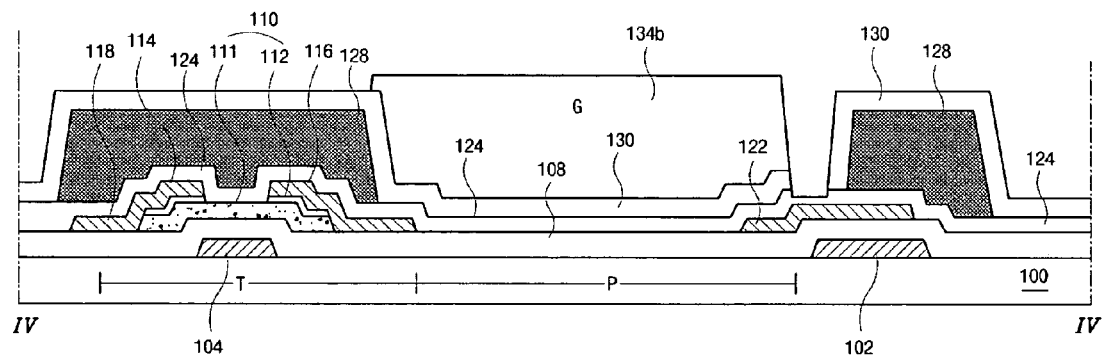
Figure 8F:
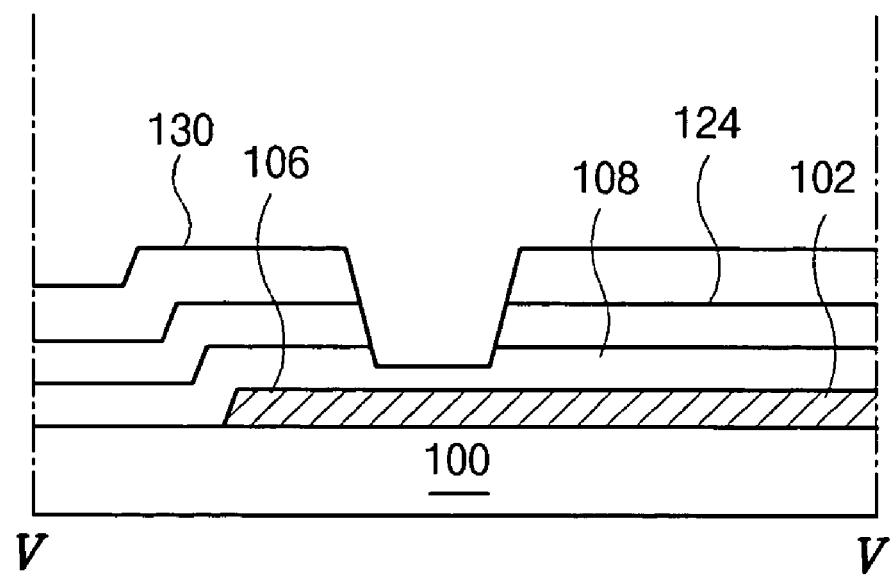
Figure 9F:
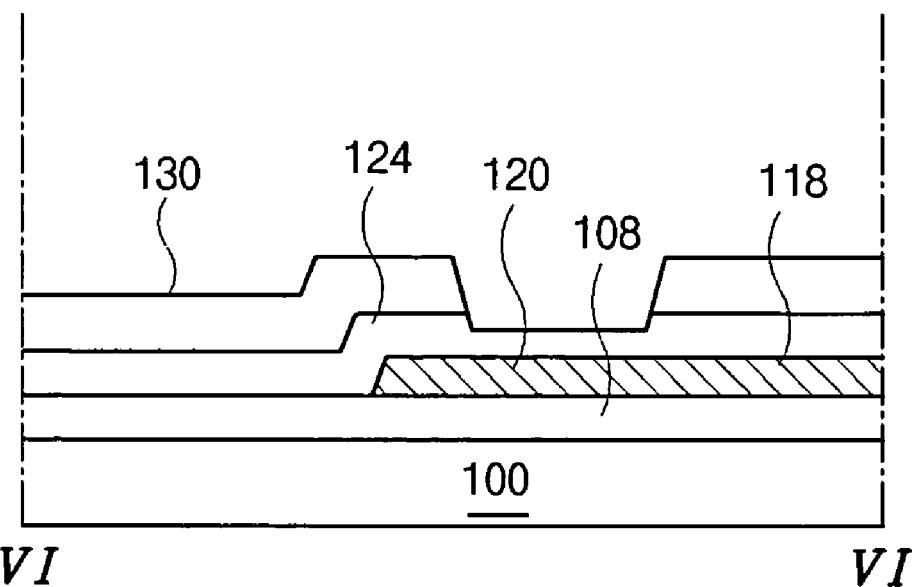

As shown in FIGS. 7F, 8F and 9F, the ashed photo-resist pattern 150b (in FIGS. 7E, 8E and 9E) is stripped, and then a green color resin is deposited on the third insulating layer 130 and patterned to form a green color filter pattern (G) 134b in the pixel region P.

Figure 7G:
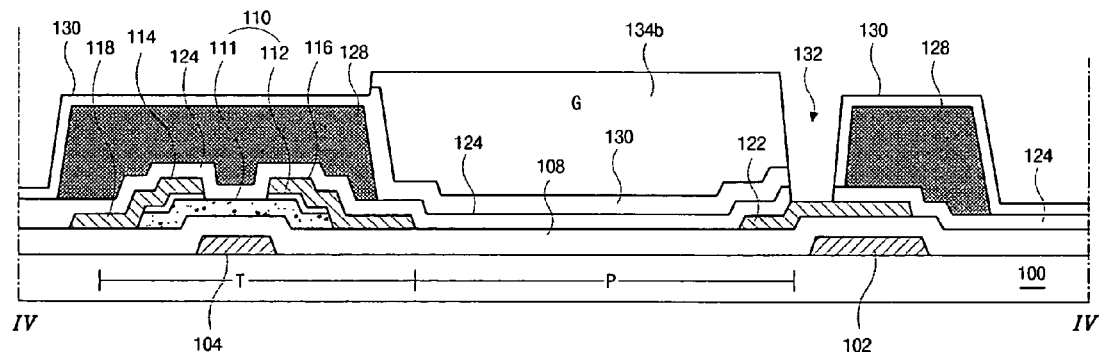
Figure 8G:
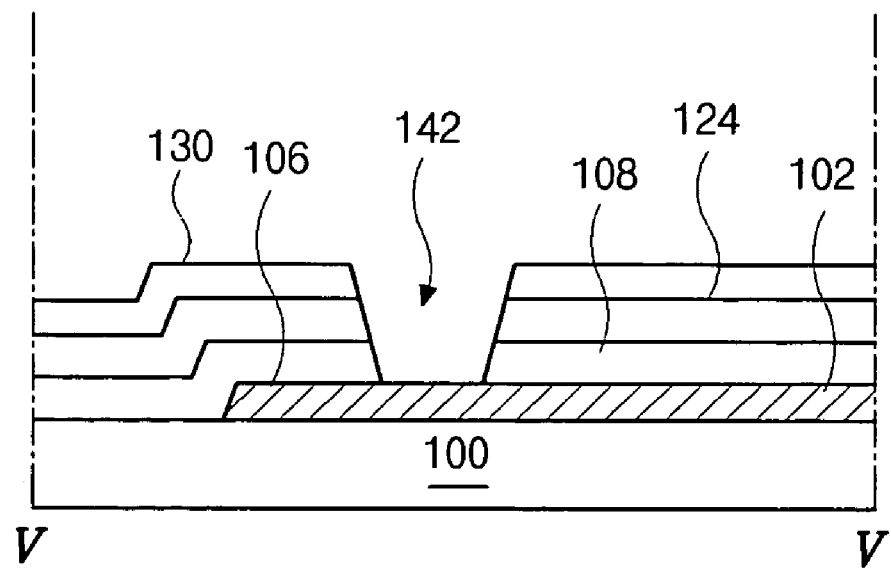
Figure 9G:
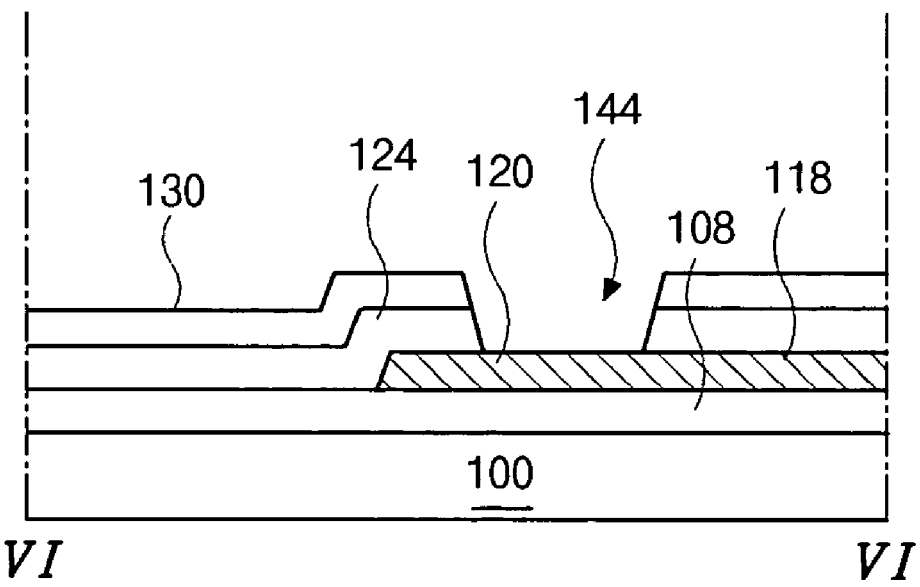

As shown in FIGS. 7G, 8G and 9G, the third, second and first insulating layers 130, 124 and 108 are etched using the green color filter pattern 134b as an etching mask. In the etching process, the third insulating layer 130 is partially removed to a depth d. Accordingly, a first portion of the third insulating layer 130 covered by the green color filter pattern 134b has a thickness D, and a second portion of the third insulating layer 130 exposed through the color filter patterns 134a, 134b and 134c has a thickness D-d. The second insulating layer 124 partially removed over the storage electrode 122 and the data pad electrode 120 is completely etched to expose the storage electrode 122 and the data pad electrode 120 and to form a storage contact hole 132 and a data pad contact hole 144. Further, the first insulating layer 124 partially removed over the gate pad electrode 106 is completely etched to expose the gate pad electrode 106 and to form a gate pad contact hole 142. In the second embodiment, the second insulating layer 124 over the drain electrode 116 is completely etched in the method similar to the etching of the second insulating layer 124 over the storage electrode 122 and the data pad electrode 120.

In the above embodiments of the present invention, the color filter patterns and the black matrix are formed on the substrate having the thin film transistor. Accordingly, misalignment in attaching upper and lower substrates of an LCD is no longer a concern. The aperture ratio of the LCD increases and light leakage is reduced in the above embodiments of the present invention. In the fabricating method of the above embodiments of the present invention, the third insulating layer is partially removed. Accordingly, residual color resins remaining in the holes can be removed, and adhesion of the pixel electrode, the gate pad terminal and the data pad terminal, and the layers can be improved. Further, in the above-described fabricating methods, the first and second insulating layers are partially etched. Accordingly, a chemical reaction, such as corrosion of metal layers below the first and second insulating layers, can be prevented.

It will be apparent to those skilled in the art that various modifications and variations can be made in the above-discussed display device and the driving method thereof without departing from the spirit or scope of the invention. Thus, it is intended that the present invention cover the modifications and variations of this invention provided they come within the scope of the appended claims and their equivalents.

What is claimed is:

1. A fabricating method of a substrate for a liquid crystal display (LCD) device, comprising:
    forming gate and data lines crossing each other to define a pixel region;
    forming a thin film transistor adjacent to where the gate and data lines cross, the thin film transistor including a gate electrode, a semiconductor pattern, a source electrode and a drain electrode;
    forming a black matrix corresponding to the gate and data lines and the thin film transistor;
    forming a first insulating layer on the black matrix;
    forming a color filter pattern on the first insulating layer corresponding to the pixel region;
    partially removing the first insulating layer using the color filter pattern as a mask such that the first insulating layer includes a first portion corresponding to the color filter pattern that is thicker than a second portion; and
    forming a pixel electrode on the color filter pattern and connected with the thin film transistor.

2. The method according to claim 1, wherein partially removing the first insulating layer includes removing the first insulating layer by a depth more than an average surface roughness of the first insulating layer.

3. The method according to claim 2, wherein the average surface roughness is root mean square of surface roughnesses of the first insulating layer.

4. The method according to claim 1, further comprising forming a storage electrode in the same process of forming the drain electrode such that the storage electrode overlaps the gate line and contacts the pixel electrode.

5. The method according to claim 4, further comprising forming a connection line in the same step of forming the drain electrode such that the connection line connects the drain electrode and the storage electrode.

6. The method according to claim 5, further comprising forming a second insulating layer between the first insulating layer and the storage electrode.

7. The method according to claim 6, further comprising:
    depositing a photo-resist on the first insulating layer;
    exposing the photo-resist with light using a mask including a transparent portion, a blocking portion and a semi-transparent portion corresponding to the storage electrode;
    developing the photo-resist to form a photo-resist pattern such that the photo-resist pattern corresponds to both the semi-transparent portion and the blocking portion;
    ashing the photo-resist pattern to remove the photo-resist pattern corresponding to the semi-transparent portion;
    removing the first insulating layer and partially removing the second insulating layer with the ashed photo-resist pattern; and
    removing the partially removed second insulating layer to form a contact hole exposing the storage electrode.

8. The method according to claim 4, further comprising forming a second insulating layer between the first insulating layer and the storage electrode.

9. The method according to claim 8, further comprising:
    depositing a photo-resist on the first insulating layer;
    exposing the photo-resist with light using a mask including a transparent portion, a blocking portion and a semi-transparent portion corresponding to the storage electrode and the drain electrode;

developing the photo-resist to form a photo-resist pattern such that the photo-resist pattern corresponds to both the semi-transparent portion and the blocking portion;

ashing the photo-resist pattern to remove the photo-resist pattern corresponding to the semi-transparent portion;

removing the first insulating layer and partially removing the second insulating layer with the ashed photo-resist pattern; and removing the partially removed second insulating layer to form first and second contact holes exposing the storage electrode and the drain electrode.

10. The method according to claim 1, further comprising forming a gate pad at one end of the gate line; and forming a data pad at one end of the data line.

11. The method according to claim 10, wherein forming the gate pad includes:

forming a gate pad electrode connected with the gate line;

forming a second insulating layer on the gate pad electrode;

forming a third insulating layer between the second insulating layer and the first insulating layer;

patterning the first, second and third insulating layers to form a contact hole;

forming a gate pad terminal contacting the gate pad electrode through the contact hole.

12. The method according to claim 11, wherein patterning the first, second and third insulating layers includes:

depositing a photo-resist on the first insulating layer;

exposing the photo-resist with light using a mask including a transparent portion, a blocking portion and a semi-transparent portion, wherein the transparent portion corresponds to the gate pad electrode;

developing the photo-resist to form a photo-resist pattern such that the photo-resist pattern corresponds to both the semi-transparent portion and the blocking portion;

removing the first insulating layer with the photo-resist pattern;

ashing the photo-resist pattern to remove the photo-resist pattern corresponding to the semi-transparent portion;

removing the third insulating layer and partially removing the second insulating layer with the ashed photo-resist pattern; and removing the partially removed second insulating layer to form the contact hole.

13. The method according to claim 10, wherein forming the data pad includes:

forming a data pad electrode connected with the data line;

forming a second insulating layer between the data pad electrode and the first insulating layer;

patterning the first and second insulating layers to form a contact hole;

forming a data pad terminal contacting the data pad electrode through the contact hole.

14. The method according to claim 13, wherein patterning the first and second insulating layers includes:

depositing a photo-resist on the first insulating layer;

exposing the photo-resist with light using a mask including a transparent portion, a blocking portion and a semi-transparent portion, wherein the semi-transparent portion corresponds to the data pad electrode;

developing the photo-resist to form a photo-resist pattern such that the photo-resist pattern corresponds to both the semi-transparent portion and the blocking portion;

ashing the photo-resist pattern to remove the photo-resist pattern corresponding to the semi-transparent portion;

removing the first insulating layer and partially removing the second insulating layer with the ashed photo-resist pattern; and removing the partially removed second insulating layer to form the contact hole.

* * * * *